US011816954B2

(12) United States Patent
Nguyen

(10) Patent No.: US 11,816,954 B2
(45) Date of Patent: *Nov. 14, 2023

(54) OPTIMIZED POWER CONSUMPTION IN A GAMING ESTABLISHMENT HAVING GAMING DEVICES

(71) Applicant: Aristocrat Technologies, Inc. (ATI), Las Vegas, NV (US)

(72) Inventor: Binh Nguyen, Reno, NV (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,315

(22) Filed: Jun. 16, 2022

(65) Prior Publication Data

US 2022/0327890 A1  Oct. 13, 2022

Related U.S. Application Data

(63) Continuation of application No. 16/351,416, filed on Mar. 12, 2019, now Pat. No. 11,380,158, which is a continuation of application No. 15/138,086, filed on Apr. 25, 2016, now Pat. No. 10,249,134, which is a
(Continued)

(51) Int. Cl.
*G07F 17/32* (2006.01)
*H02J 9/00* (2006.01)

(52) U.S. Cl.
CPC ............ *G07F 17/3227* (2013.01); *H02J 9/00* (2013.01); *G07F 17/3202* (2013.01); *G07F 17/3223* (2013.01)

(58) Field of Classification Search
CPC .... G06F 1/3202; G06F 1/3289; G06F 1/3231; G06F 1/3228; G06F 1/26; G06F 1/206; G07F 17/3227; G07F 17/3223; H02J 9/00; H04L 12/10; H04L 12/12
See application file for complete search history.

(56) References Cited

U.S. PATENT DOCUMENTS

| | | | |
|---|---|---|---|
| 2,033,638 A | 3/1936 | Koppl | |
| 2,062,923 A | 12/1936 | Pal | |
| 4,741,539 A | 5/1988 | Sutton | |

(Continued)

FOREIGN PATENT DOCUMENTS

| | | |
|---|---|---|
| GB | 2033638 A | 5/1980 |
| GB | 2062923 A | 5/1981 |

(Continued)

OTHER PUBLICATIONS

Final Office Action for U.S. Appl. No. 13/801,234, dated Aug. 14, 2015.

(Continued)

*Primary Examiner* — Zahid Choudhury
(74) *Attorney, Agent, or Firm* — McAndrews, Held & Malloy, Ltd.

(57) ABSTRACT

In one embodiment, a gaming system, method, and device may have a memory having a plurality of power management rules and a processor configured to receive a power status information from another device, retrieve at least one power management rule from the memory, and configure a power state of the gaming device or its peripheral device based on the power status information and the at least one power management rule.

20 Claims, 15 Drawing Sheets

Related U.S. Application Data continuation of application No. 13/557,063, filed on Jul. 24, 2012, now Pat. No. 9,325,203.

(56) References Cited

U.S. PATENT DOCUMENTS

| | | |
|---|---|---|
| 4,948,138 A | 8/1990 | Pease |
| 5,067,712 A | 11/1991 | Georgilas |
| 5,429,361 A | 7/1995 | Raven |
| 5,489,103 A | 2/1996 | Okamoto |
| 5,630,757 A | 5/1997 | Gagin |
| 5,655,961 A | 8/1997 | Acres |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell |
| 5,947,820 A | 9/1999 | Morro |
| 5,997,401 A | 12/1999 | Crawford |
| 6,001,016 A | 12/1999 | Walker |
| 6,039,648 A | 3/2000 | Guinn |
| 6,059,289 A | 5/2000 | Vancura |
| 6,089,977 A | 7/2000 | Bennett |
| 6,095,920 A | 8/2000 | Sadahiro |
| 6,110,041 A | 8/2000 | Walker |
| 6,142,872 A | 11/2000 | Walker |
| 6,146,273 A | 11/2000 | Olsen |
| 6,165,071 A | 12/2000 | Weiss |
| 6,231,445 B1 | 5/2001 | Acres |
| 6,270,412 B1 | 8/2001 | Crawford |
| 6,290,600 B1 | 9/2001 | Glasson |
| 6,293,866 B1 | 9/2001 | Walker |
| 6,353,390 B1 | 3/2002 | Beri |
| 6,364,768 B1 | 4/2002 | Acres |
| 6,404,884 B1 | 6/2002 | Marwell |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham |
| 6,505,095 B1 | 1/2003 | Kolls |
| 6,508,710 B1 | 1/2003 | Paravia |
| 6,561,900 B1 | 5/2003 | Baerlocher |
| 6,592,457 B1 | 7/2003 | Frohm |
| 6,612,574 B1 | 9/2003 | Cole |
| 6,620,046 B2 | 9/2003 | Rowe |
| 6,641,477 B1 | 11/2003 | Dietz, II |
| 6,645,078 B1 | 11/2003 | Mattice |
| 6,719,630 B1 | 4/2004 | Seelig |
| 6,749,510 B2 | 6/2004 | Giobbi |
| 6,758,757 B2 | 7/2004 | Luciano, Jr. |
| 6,773,345 B2 | 8/2004 | Walker |
| 6,778,820 B2 | 8/2004 | Tendler |
| 6,780,111 B2 | 8/2004 | Cannon |
| 6,799,032 B2 | 9/2004 | McDonnell |
| 6,800,027 B2 | 10/2004 | Giobbi |
| 6,804,763 B1 | 10/2004 | Stockdale |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker |
| 6,852,029 B2 | 2/2005 | Baltz |
| 6,869,361 B2 | 3/2005 | Sharpless |
| 6,875,106 B2 | 4/2005 | Weiss |
| 6,884,170 B2 | 4/2005 | Rowe |
| 6,884,172 B1 | 4/2005 | Lloyd |
| 6,902,484 B2 | 6/2005 | Idaka |
| 6,908,390 B2 | 6/2005 | Nguyen |
| 6,913,532 B2 | 7/2005 | Baerlocher |
| 6,923,721 B2 | 8/2005 | Luciano |
| 6,935,958 B2 | 8/2005 | Nelson |
| 6,949,022 B1 | 9/2005 | Showers |
| 6,955,600 B2 | 10/2005 | Glavich |
| 6,971,956 B2 | 12/2005 | Rowe |
| 6,984,174 B2 | 1/2006 | Cannon |
| 6,997,803 B2 | 2/2006 | Lemay |
| 7,018,292 B2 | 3/2006 | Tracy |
| 7,032,115 B2 | 4/2006 | Kashani |
| 7,033,276 B2 | 4/2006 | Walker |
| 7,035,626 B1 | 4/2006 | Luciano, Jr. |
| 7,037,195 B2 | 5/2006 | Schneider |
| 7,048,628 B2 | 5/2006 | Schneider |
| 7,048,630 B2 | 5/2006 | Berg |
| 7,063,617 B2 | 6/2006 | Brosnan |
| 7,076,329 B1 | 7/2006 | Kolls |
| 7,089,264 B1 | 8/2006 | Guido |
| 7,094,148 B2 | 8/2006 | Baerlocher |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer |
| 7,169,052 B2 | 1/2007 | Beaulieu |
| 7,175,523 B2 | 2/2007 | Gilmore |
| 7,181,228 B2 | 2/2007 | Boesch |
| 7,182,690 B2 | 2/2007 | Giobbi |
| RE39,644 E | 5/2007 | Alcorn |
| 7,217,191 B2 | 5/2007 | Cordell |
| 7,243,104 B2 | 7/2007 | Bill |
| 7,247,098 B1 | 7/2007 | Bradford |
| 7,259,718 B2 | 8/2007 | Patterson |
| 7,275,989 B2 | 10/2007 | Moody |
| 7,285,047 B2 | 10/2007 | Gelb |
| 7,311,608 B1 | 12/2007 | Danieli |
| 7,314,408 B2 | 1/2008 | Cannon |
| 7,316,615 B2 | 1/2008 | Soltys |
| 7,316,619 B2 | 1/2008 | Nelson |
| 7,318,775 B2 | 1/2008 | Brosnan |
| 7,326,116 B2 | 2/2008 | O'Donovan |
| 7,330,108 B2 | 2/2008 | Thomas |
| 7,346,358 B2 | 3/2008 | Wood |
| 7,355,112 B2 | 4/2008 | Laakso |
| 7,384,338 B2 | 6/2008 | Rothschild |
| 7,387,571 B2 | 6/2008 | Walker |
| 7,393,278 B2 | 7/2008 | Gerson |
| 7,396,990 B2 | 7/2008 | Lu |
| 7,415,426 B2 | 8/2008 | Williams |
| 7,425,177 B2 | 9/2008 | Rodgers |
| 7,427,234 B2 | 9/2008 | Soltys |
| 7,427,236 B2 | 9/2008 | Kaminkow |
| 7,427,708 B2 | 9/2008 | Ohmura |
| 7,431,650 B2 | 10/2008 | Kessman |
| 7,448,949 B2 | 11/2008 | Kaminkow |
| 7,500,913 B2 | 3/2009 | Baerlocher |
| 7,510,474 B2 | 3/2009 | Carter, Sr. |
| 7,513,828 B2 | 4/2009 | Nguyen |
| 7,519,838 B1 | 4/2009 | Suurballe |
| 7,559,838 B2 | 7/2009 | Walker |
| 7,563,167 B2 | 7/2009 | Walker |
| 7,572,183 B2 | 8/2009 | Olivas |
| 7,585,222 B2 | 9/2009 | Muir |
| 7,602,298 B2 | 10/2009 | Thomas |
| 7,607,174 B1 | 10/2009 | Kashchenko |
| 7,611,409 B2 | 11/2009 | Muir |
| 7,637,810 B2 | 12/2009 | Amaitis |
| 7,644,861 B2 | 1/2010 | Alderucci |
| 7,653,757 B1 | 1/2010 | Fernald |
| 7,693,306 B2 | 4/2010 | Huber |
| 7,699,703 B2 | 4/2010 | Muir |
| 7,722,453 B2 | 5/2010 | Lark |
| 7,758,423 B2 | 7/2010 | Foster |
| 7,771,271 B2 | 8/2010 | Walker |
| 7,780,529 B2 | 8/2010 | Rowe |
| 7,780,531 B2 | 8/2010 | Englman |
| 7,785,192 B2 | 8/2010 | Canterbury |
| 7,811,172 B2 | 10/2010 | Asher |
| 7,819,749 B1 | 10/2010 | Fish |
| 7,822,688 B2 | 10/2010 | Labrou |
| 7,828,652 B2 | 11/2010 | Nguyen |
| 7,828,654 B2 | 11/2010 | Carter, Sr. |
| 7,828,661 B1 | 11/2010 | Fish |
| 7,850,528 B2 | 12/2010 | Wells |
| 7,874,919 B2 | 1/2011 | Paulsen |
| 7,877,798 B2 | 1/2011 | Saunders |
| 7,883,413 B2 | 2/2011 | Paulsen |
| 7,892,097 B2 | 2/2011 | Muir |

(56) References Cited

U.S. PATENT DOCUMENTS

| | | |
|---|---|---|
| 7,909,692 B2 | 3/2011 | Nguyen |
| 7,909,699 B2 | 3/2011 | Parrott |
| 7,918,728 B2 | 4/2011 | Nguyen |
| 7,927,211 B2 | 4/2011 | Rowe |
| 7,927,212 B2 | 4/2011 | Hedrick |
| 7,951,008 B2 | 5/2011 | Wolf |
| 8,057,298 B2 | 11/2011 | Nguyen |
| 8,057,303 B2 | 11/2011 | Rasmussen |
| 8,087,988 B2 | 1/2012 | Nguyen |
| 8,117,608 B1 | 2/2012 | Slettehaugh |
| 8,133,113 B2 | 3/2012 | Nguyen |
| 8,182,326 B2 | 5/2012 | Speer, II |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen |
| 8,231,456 B2 | 7/2012 | Zielinski |
| 8,235,803 B2 | 8/2012 | Loose |
| 8,276,010 B2 | 9/2012 | Vavilala |
| 8,282,475 B2 | 10/2012 | Nguyen |
| 8,323,099 B2 | 12/2012 | Durham |
| 8,337,290 B2 | 12/2012 | Nguyen |
| 8,342,946 B2 | 1/2013 | Amaitis |
| 8,393,948 B2 | 3/2013 | Allen |
| 8,403,758 B2 | 3/2013 | Hornik |
| 8,430,745 B2 | 4/2013 | Agarwal |
| 8,461,958 B2 | 6/2013 | Saenz |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson |
| 8,696,470 B2 | 4/2014 | Nguyen |
| 8,745,417 B2 | 6/2014 | Huang |
| 8,858,323 B2 | 10/2014 | Nguyen |
| 8,864,586 B2 | 10/2014 | Nguyen |
| 8,942,995 B1 | 1/2015 | Kerr |
| 9,039,507 B2 | 5/2015 | Allen |
| 9,235,952 B2 | 1/2016 | Nguyen |
| 9,292,996 B2 | 3/2016 | Davis |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,576,425 B2 | 2/2017 | Nguyen |
| 9,626,826 B2 | 4/2017 | Nguyen |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi |
| 10,140,816 B2 | 11/2018 | Nguyen |
| 11,386,747 B2 * | 7/2022 | Nguyen .............. G07F 17/3223 |
| 11,488,440 B2 * | 11/2022 | Nguyen .............. G07F 17/3223 |
| 2001/0004607 A1 | 6/2001 | Olsen |
| 2001/0016516 A1 | 8/2001 | Takatsuka |
| 2001/0024971 A1 | 9/2001 | Brossard |
| 2001/0047291 A1 | 11/2001 | Garahi |
| 2002/0006822 A1 | 1/2002 | Krintzman |
| 2002/0042295 A1 | 4/2002 | Walker |
| 2002/0043759 A1 | 4/2002 | Vancura |
| 2002/0045474 A1 | 4/2002 | Singer |
| 2002/0111210 A1 | 8/2002 | Anthony |
| 2002/0111213 A1 | 8/2002 | Mcentee |
| 2002/0113369 A1 | 8/2002 | Weingardt |
| 2002/0116615 A1 | 8/2002 | Nguyen |
| 2002/0133418 A1 | 9/2002 | Hammond |
| 2002/0137217 A1 | 9/2002 | Rowe |
| 2002/0142825 A1 | 10/2002 | Lark |
| 2002/0147047 A1 | 10/2002 | Letovsky |
| 2002/0147049 A1 | 10/2002 | Carter |
| 2002/0151366 A1 | 10/2002 | Walker |
| 2002/0152120 A1 | 10/2002 | Howington |
| 2002/0167536 A1 | 11/2002 | Valdes |
| 2002/0177483 A1 | 11/2002 | Cannon |
| 2002/0183105 A1 | 12/2002 | Cannon |
| 2003/0001338 A1 | 1/2003 | Bennett |
| 2003/0003996 A1 | 1/2003 | Nguyen |
| 2003/0008696 A1 | 1/2003 | Abecassis |
| 2003/0027635 A1 | 2/2003 | Walker |
| 2003/0064805 A1 | 4/2003 | Wells |
| 2003/0064807 A1 | 4/2003 | Walker |
| 2003/0092480 A1 | 5/2003 | White |
| 2003/0100361 A1 | 5/2003 | Sharpless |
| 2003/0103965 A1 | 6/2003 | Jung |
| 2003/0104860 A1 | 6/2003 | Cannon |
| 2003/0104865 A1 | 6/2003 | Itkis |
| 2003/0148809 A1 | 8/2003 | Nelson |
| 2003/0162588 A1 | 8/2003 | Brosnan |
| 2003/0195024 A1 | 10/2003 | Slattery |
| 2003/0199295 A1 | 10/2003 | Vancura |
| 2003/0224852 A1 | 12/2003 | Walker |
| 2003/0224854 A1 | 12/2003 | Joao |
| 2004/0002386 A1 | 1/2004 | Wolfe |
| 2004/0005919 A1 | 1/2004 | Walker |
| 2004/0015619 A1 | 1/2004 | Brown |
| 2004/0023709 A1 | 2/2004 | Beaulieu |
| 2004/0023716 A1 | 2/2004 | Gauselmann |
| 2004/0038736 A1 | 2/2004 | Bryant |
| 2004/0048650 A1 | 3/2004 | Mierau |
| 2004/0068460 A1 | 4/2004 | Feeley |
| 2004/0082385 A1 | 4/2004 | Silva |
| 2004/0106449 A1 | 6/2004 | Walker |
| 2004/0127277 A1 | 7/2004 | Walker |
| 2004/0127290 A1 | 7/2004 | Walker |
| 2004/0137987 A1 | 7/2004 | Nguyen |
| 2004/0147308 A1 | 7/2004 | Walker |
| 2004/0152508 A1 | 8/2004 | Lind |
| 2004/0199631 A1 | 10/2004 | Natsume |
| 2004/0214622 A1 | 10/2004 | Atkinson |
| 2004/0224753 A1 | 11/2004 | O'Donovan |
| 2004/0256803 A1 | 12/2004 | Ko |
| 2004/0259633 A1 | 12/2004 | Gentles |
| 2005/0003890 A1 | 1/2005 | Hedrick |
| 2005/0004980 A1 | 1/2005 | Vadjinia |
| 2005/0026696 A1 | 2/2005 | Hashimoto |
| 2005/0054446 A1 | 3/2005 | Kammler |
| 2005/0101376 A1 | 5/2005 | Walker |
| 2005/0101383 A1 | 5/2005 | Wells |
| 2005/0130728 A1 | 6/2005 | Nguyen |
| 2005/0137014 A1 | 6/2005 | Vetelainen |
| 2005/0170883 A1 | 8/2005 | Muskin |
| 2005/0181865 A1 | 8/2005 | Luciano |
| 2005/0181870 A1 | 8/2005 | Nguyen |
| 2005/0181875 A1 | 8/2005 | Hoehne |
| 2005/0187020 A1 | 8/2005 | Amaitis |
| 2005/0202875 A1 | 9/2005 | Murphy |
| 2005/0209002 A1 | 9/2005 | Blythe |
| 2005/0221881 A1 | 10/2005 | Lannert |
| 2005/0223219 A1 | 10/2005 | Gatto |
| 2005/0239546 A1 | 10/2005 | Hedrick |
| 2005/0255919 A1 | 11/2005 | Nelson |
| 2005/0273635 A1 | 12/2005 | Wilcox |
| 2005/0277471 A1 | 12/2005 | Russell |
| 2005/0282637 A1 | 12/2005 | Gatto |
| 2006/0009283 A1 | 1/2006 | Englman |
| 2006/0036874 A1 | 2/2006 | Cockerille |
| 2006/0046822 A1 | 3/2006 | Kaminkow |
| 2006/0046830 A1 | 3/2006 | Webb |
| 2006/0046849 A1 | 3/2006 | Kovacs |
| 2006/0068893 A1 | 3/2006 | Jaffe |
| 2006/0073869 A1 | 4/2006 | Lemay |
| 2006/0073897 A1 | 4/2006 | Englman |
| 2006/0079317 A1 | 4/2006 | Flemming |
| 2006/0126529 A1 | 6/2006 | Hardy |
| 2006/0148551 A1 | 7/2006 | Walker |
| 2006/0189382 A1 | 8/2006 | Muir |
| 2006/0217170 A1 | 9/2006 | Roireau |

(56) References Cited

U.S. PATENT DOCUMENTS

| | | |
|---|---|---|
| 2006/0217193 A1 | 9/2006 | Walker |
| 2006/0247028 A1 | 11/2006 | Brosnan |
| 2006/0247035 A1 | 11/2006 | Rowe |
| 2006/0252530 A1 | 11/2006 | Oberberger |
| 2006/0253481 A1 | 11/2006 | Guido |
| 2006/0281525 A1 | 12/2006 | Borissov |
| 2006/0281541 A1 | 12/2006 | Nguyen |
| 2006/0287106 A1 | 12/2006 | Jensen |
| 2007/0004510 A1 | 1/2007 | Underdahl |
| 2007/0026935 A1 | 2/2007 | Wolf |
| 2007/0026942 A1 | 2/2007 | Kinsley |
| 2007/0054739 A1 | 3/2007 | Amaitis |
| 2007/0060254 A1 | 3/2007 | Muir |
| 2007/0060306 A1 | 3/2007 | Amaitis |
| 2007/0060319 A1 | 3/2007 | Block |
| 2007/0060358 A1 | 3/2007 | Amaitis |
| 2007/0077981 A1 | 4/2007 | Hungate |
| 2007/0087833 A1 | 4/2007 | Feeney |
| 2007/0087834 A1 | 4/2007 | Moser |
| 2007/0093299 A1 | 4/2007 | Bergeron |
| 2007/0129123 A1 | 6/2007 | Eryou |
| 2007/0149279 A1 | 6/2007 | Norden |
| 2007/0149286 A1 | 6/2007 | Bemmel |
| 2007/0159301 A1 | 7/2007 | Hirt |
| 2007/0161402 A1 | 7/2007 | Ng |
| 2007/0184896 A1 | 8/2007 | Dickerson |
| 2007/0184904 A1 | 8/2007 | Lee |
| 2007/0191109 A1 | 8/2007 | Crowder, Jr. |
| 2007/0207852 A1 | 9/2007 | Nelson |
| 2007/0207854 A1 | 9/2007 | Wolf |
| 2007/0238505 A1 | 10/2007 | Okada |
| 2007/0241187 A1 | 10/2007 | Alderucci |
| 2007/0248036 A1 | 10/2007 | Nevalainen |
| 2007/0257430 A1 | 11/2007 | Hardy |
| 2007/0259713 A1 | 11/2007 | Fiden |
| 2007/0259717 A1 | 11/2007 | Mattice |
| 2007/0270213 A1 | 11/2007 | Nguyen |
| 2007/0275777 A1 | 11/2007 | Walker |
| 2007/0275779 A1 | 11/2007 | Amaitis |
| 2007/0281782 A1 | 12/2007 | Amaitis |
| 2007/0281785 A1 | 12/2007 | Amaitis |
| 2007/0298873 A1 | 12/2007 | Nguyen |
| 2008/0013906 A1 | 1/2008 | Matsuo |
| 2008/0015032 A1 | 1/2008 | Bradford |
| 2008/0020824 A1 | 1/2008 | Cuddy |
| 2008/0032787 A1 | 2/2008 | Low |
| 2008/0070652 A1 | 3/2008 | Nguyen |
| 2008/0070681 A1 | 3/2008 | Marks |
| 2008/0076505 A1 | 3/2008 | Nguyen |
| 2008/0076506 A1 | 3/2008 | Nguyen |
| 2008/0076548 A1 | 3/2008 | Paulsen |
| 2008/0076572 A1 | 3/2008 | Nguyen |
| 2008/0096650 A1 | 4/2008 | Baerlocher |
| 2008/0102956 A1 | 5/2008 | Burman |
| 2008/0102957 A1 | 5/2008 | Burman |
| 2008/0113772 A1 | 5/2008 | Burrill |
| 2008/0119267 A1 | 5/2008 | Denlay |
| 2008/0139306 A1 | 6/2008 | Lutnick |
| 2008/0146321 A1 | 6/2008 | Parente |
| 2008/0146344 A1 | 6/2008 | Rowe |
| 2008/0150902 A1 | 6/2008 | Edpalm |
| 2008/0153583 A1 | 6/2008 | Huntley |
| 2008/0161110 A1 | 7/2008 | Campbell |
| 2008/0167106 A1 | 7/2008 | Lutnick |
| 2008/0182667 A1 | 7/2008 | Davis |
| 2008/0207307 A1 | 8/2008 | Cunningham, II |
| 2008/0214258 A1 | 9/2008 | Brosnan |
| 2008/0215319 A1 | 9/2008 | Lu |
| 2008/0234047 A1 | 9/2008 | Nguyen |
| 2008/0238610 A1 | 10/2008 | Rosenberg |
| 2008/0248849 A1 | 10/2008 | Lutnick |
| 2008/0248865 A1 | 10/2008 | Tedesco |
| 2008/0252419 A1 | 10/2008 | Batchelor |
| 2008/0254878 A1 | 10/2008 | Saunders |
| 2008/0254881 A1 | 10/2008 | Lutnick |
| 2008/0254883 A1 | 10/2008 | Patel |
| 2008/0254891 A1 | 10/2008 | Saunders |
| 2008/0254892 A1 | 10/2008 | Saunders |
| 2008/0254897 A1 | 10/2008 | Saunders |
| 2008/0263173 A1 | 10/2008 | Weber |
| 2008/0300058 A1 | 12/2008 | Sum |
| 2008/0305864 A1 | 12/2008 | Kelly |
| 2008/0305865 A1 | 12/2008 | Kelly |
| 2008/0305866 A1 | 12/2008 | Kelly |
| 2008/0311994 A1 | 12/2008 | Amaitis |
| 2008/0318669 A1 | 12/2008 | Buchholz |
| 2008/0318686 A1 | 12/2008 | Crowder |
| 2009/0005165 A1 | 1/2009 | Arezina |
| 2009/0011822 A1 | 1/2009 | Englman |
| 2009/0017906 A1 | 1/2009 | Jackson |
| 2009/0029766 A1 | 1/2009 | Lutnick |
| 2009/0054149 A1 | 2/2009 | Brosnan |
| 2009/0077396 A1 | 3/2009 | Tsai |
| 2009/0088258 A1 | 4/2009 | Saunders |
| 2009/0098925 A1 | 4/2009 | Gagner |
| 2009/0104977 A1 | 4/2009 | Zielinski |
| 2009/0104983 A1 | 4/2009 | Okada |
| 2009/0118002 A1 | 5/2009 | Yons |
| 2009/0118013 A1 | 5/2009 | Finnimore |
| 2009/0118022 A1 | 5/2009 | Lyons |
| 2009/0124366 A1 | 5/2009 | Aoki |
| 2009/0124390 A1 | 5/2009 | Seelig |
| 2009/0131151 A1 | 5/2009 | Harris |
| 2009/0132163 A1 | 5/2009 | Ashley, Jr. |
| 2009/0137255 A1 | 5/2009 | Ashley, Jr. |
| 2009/0138133 A1 | 5/2009 | Buchholz |
| 2009/0149245 A1 | 6/2009 | Fabbri |
| 2009/0149261 A1 | 6/2009 | Chen |
| 2009/0153342 A1 | 6/2009 | Thorn |
| 2009/0156303 A1 | 6/2009 | Kiely |
| 2009/0163272 A1 | 6/2009 | Baker |
| 2009/0176578 A1 | 7/2009 | Herrmann |
| 2009/0191962 A1 | 7/2009 | Hardy |
| 2009/0197684 A1 | 8/2009 | Arezina |
| 2009/0216547 A1 | 8/2009 | Canora |
| 2009/0219901 A1 | 9/2009 | Bull |
| 2009/0221342 A1 | 9/2009 | Katz |
| 2009/0227302 A1 | 9/2009 | Abe |
| 2009/0239666 A1 | 9/2009 | Hall |
| 2009/0264190 A1 | 10/2009 | Davis |
| 2009/0271287 A1 | 10/2009 | Halpern |
| 2009/0275410 A1 | 11/2009 | Kisenwether |
| 2009/0275411 A1 | 11/2009 | Kisenwether |
| 2009/0280910 A1 | 11/2009 | Gagner |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0049738 A1 | 2/2010 | Mathur |
| 2010/0056248 A1 | 3/2010 | Acres |
| 2010/0062833 A1 | 3/2010 | Mattice |
| 2010/0062840 A1 | 3/2010 | Herrmann |
| 2010/0079237 A1 | 4/2010 | Falk |
| 2010/0081501 A1 | 4/2010 | Carpenter |
| 2010/0081509 A1 | 4/2010 | Burke |
| 2010/0099499 A1 | 4/2010 | Amaitis |
| 2010/0106612 A1 | 4/2010 | Gupta |
| 2010/0120486 A1 | 5/2010 | Dewaal |
| 2010/0124967 A1 | 5/2010 | Lutnick |
| 2010/0130276 A1 | 5/2010 | Fiden |
| 2010/0160035 A1 | 6/2010 | Herrmann |
| 2010/0160043 A1 | 6/2010 | Fujimoto |
| 2010/0178977 A1 | 7/2010 | Kim |
| 2010/0197383 A1 | 8/2010 | Rader |
| 2010/0197385 A1 | 8/2010 | Aoki |
| 2010/0203955 A1 | 8/2010 | Sylla |
| 2010/0203963 A1 | 8/2010 | Allen |
| 2010/0227662 A1 | 9/2010 | Speer, II |
| 2010/0227670 A1 | 9/2010 | Arezina |
| 2010/0227671 A1 | 9/2010 | Laaroussi |
| 2010/0227687 A1 | 9/2010 | Speer, II |
| 2010/0234091 A1 | 9/2010 | Baerlocher |
| 2010/0279764 A1 | 11/2010 | Allen |

(56) References Cited

U.S. PATENT DOCUMENTS

| | | |
|---|---|---|
| 2010/0323780 A1 | 12/2010 | Acres |
| 2010/0325703 A1 | 12/2010 | Etchegoyen |
| 2011/0009181 A1 | 1/2011 | Speer, II |
| 2011/0039615 A1 | 2/2011 | Acres |
| 2011/0065492 A1 | 3/2011 | Acres |
| 2011/0105216 A1 | 5/2011 | Cohen |
| 2011/0111827 A1 | 5/2011 | Nicely |
| 2011/0111843 A1 | 5/2011 | Nicely |
| 2011/0111860 A1 | 5/2011 | Nguyen |
| 2011/0118010 A1 | 5/2011 | Brune |
| 2011/0159966 A1 | 6/2011 | Gura |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay |
| 2011/0223993 A1 | 9/2011 | Allen |
| 2011/0263318 A1 | 10/2011 | Agarwal |
| 2011/0269548 A1 | 11/2011 | Barclay |
| 2011/0306400 A1 | 12/2011 | Nguyen |
| 2011/0306426 A1 | 12/2011 | Novak |
| 2012/0015709 A1 | 1/2012 | Bennett |
| 2012/0028703 A1 | 2/2012 | Anderson |
| 2012/0028718 A1 | 2/2012 | Barclay |
| 2012/0034968 A1 | 2/2012 | Watkins |
| 2012/0046110 A1 | 2/2012 | Amaitis |
| 2012/0094769 A1 | 4/2012 | Nguyen |
| 2012/0100908 A1 | 4/2012 | Wells |
| 2012/0108319 A1 | 5/2012 | Caputo |
| 2012/0122561 A1 | 5/2012 | Hedrick |
| 2012/0122567 A1 | 5/2012 | Gangadharan |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay |
| 2012/0184363 A1 | 7/2012 | Barclay |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer II |
| 2012/0239566 A1 | 9/2012 | Everett |
| 2012/0322563 A1 | 12/2012 | Nguyen |
| 2012/0330740 A1 | 12/2012 | Pennington |
| 2013/0005433 A1 | 1/2013 | Holch |
| 2013/0005443 A1 | 1/2013 | Kosta |
| 2013/0005453 A1 | 1/2013 | Nguyen |
| 2013/0059650 A1 | 3/2013 | Sylla |
| 2013/0065668 A1 | 3/2013 | Lemay |
| 2013/0103965 A1 | 4/2013 | Golembeski, Jr. |
| 2013/0104193 A1 | 4/2013 | Gatto |
| 2013/0132745 A1 | 5/2013 | Schoening |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams |
| 2013/0252730 A1 | 9/2013 | Joshi |
| 2013/0281188 A1 | 10/2013 | Guinn |
| 2013/0316808 A1 | 11/2013 | Nelson |
| 2014/0006129 A1 | 1/2014 | Heath |
| 2014/0057716 A1 | 2/2014 | Massing |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter, Sr. |
| 2015/0143543 A1 | 5/2015 | Phegade |
| 2016/0125695 A1 | 5/2016 | Nguyen |
| 2017/0016819 A1 | 1/2017 | Barwicz |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0243440 A1 | 8/2017 | Nguyen |
| 2017/0337770 A1 | 11/2017 | Nguyen |
| 2018/0144581 A1 | 5/2018 | Nguyen |
| 2019/0005773 A1 | 1/2019 | Nguyen |

FOREIGN PATENT DOCUMENTS

| | | |
|---|---|---|
| GB | 2096376 A | 10/1982 |
| GB | 2097570 A | 11/1982 |
| GB | 2335524 A | 9/1999 |
| JP | 12005000454 | 5/2007 |
| WO | 2005073933 | 8/2005 |
| WO | 2008027621 | 3/2008 |
| WO | 2009026309 | 2/2009 |
| WO | 2009062148 | 5/2009 |
| WO | 2010017252 | 2/2010 |

OTHER PUBLICATIONS

Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Final Office Action for U.S. Appl. No. 13/843, 192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/800,917, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final Office Action for U.S. Appl. No. 12/945,888, dated Jun. 28, 2016.

(56) References Cited

OTHER PUBLICATIONS

Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Office Action for U.S. Appl. No. 13/296,182, dated Dec. 23, 2015.
Advisory Action for U.S. Appl. No. 13/843,192, dated May 8, 2014.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Benston, Liz, "Harrahs Launches iPhone App; Caesars Bypasses Check-in," Las Vegas Sun, Las Vegas, NV. Jan. 8, 2010.
Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
APS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2013.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717, dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Non-Final Office Action for U.S. Appl. No. 13/801, 21, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.

(56) References Cited

OTHER PUBLICATIONS

Advisory Action for U.S. Appl. No. 14/189,948, dated Jul. 28, 2017.
Final Office Action for U.S. Appl. No. 13/801,256, dated Aug. 15, 2014.
Final Office Action for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 12/797,616 dated Oct. 13, 2012.
Office Action for U.S. Appl. No. 12/797,616 dated Mar. 15, 2012.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action fpr U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 12/797,610, dated Jul. 14, 2015.
Office Action for U.S. Appl. No. 12/797,616 dated Feb. 13, 2013.
Office Action for U.S. Appl. No. 13/801,271, dated Oct. 31, 2014.
Office Action for U.S. Appl. No. 13/833,116, dated Mar. 27, 2015.
Office Action for U.S. Appl. No. 13/843,192, dated Jun. 19, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
U.S. Appl. No. 13/622,702, filed Sep. 19, 2012.
Office Action for U.S. Appl. No. 13/843,087, dated Feb. 25, 2016.
Advisory Action for U.S. Appl. No. 13/632,828, dated Feb. 25, 2016.
Office Action for U.S. Appl. No. 13/622,702, dated Mar. 22, 2016.
Notice of Allowance for U.S. Appl. No. 13/843,192, dated Aug. 10, 2016.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.

(56) References Cited

OTHER PUBLICATIONS

Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action (Notice of Allowance and Fees Due (PTOL-85)) dated Feb. 17, 2022 for U.S. Appl. No. 16/351,416 (pp. 1-7).
Office Action (Notice of Allowance and Fees Due (PTOL-85)) dated Mar. 8, 2022 for U.S. Appl. No. 16/351,416 (pp. 1-2).
Office Action (Notice of Allowance and Fees Due (PTOL-85)) dated Mar. 23, 2022 for U.S. Appl. No. 16/351,416 (pp. 1-2).

\* cited by examiner

OPTIMIZED POWER CONSUMPTION IN A GAMING ESTABLISHMENT HAVING GAMING DEVICES

RELATED APPLICATIONS

The present application is a continuation of and claims priority to U.S. patent application Ser. No. 16/351,416, filed Mar. 12, 2019, and entitled "Optimized Power Consumption in a Gaming Establishment Having Gaming Devices," which issued on Jul. 5, 2022 as U.S. Pat. No. 11,380,158, which is a continuation of U.S. patent application Ser. No. 15/138,086, filed Apr. 25, 2016, and entitled "Optimized Power Consumption in a Network of Gaming Devices," which issued on Apr. 2, 2019 as U.S. Pat. No. 10,249,134, which is a continuation of U.S. application Ser. No. 13/557,063, filed Jul. 24, 2012, and entitled "Optimized Power Consumption in a Gaming Device," which issued on Apr. 26, 2016, as U.S. Pat. No. 9,325,203, all of which are hereby incorporated by reference in their entireties.

FIELD OF INVENTION

The present invention relates to reducing energy consumption in electronic devices, particularly to reducing energy consumption in gaming devices, and more particularly to reducing energy consumption in a network of gaming devices.

BACKGROUND

Energy consumption at gaming establishments has been increasing for many years. Gaming establishments generally prefer to maintain a bright and stimulating environment. However, many gaming devices in the gaming establishment are not used constantly during the course of a day. Those gaming devices may be wastefully running at full power because they are not being utilized or even viewed by patrons. Power expenditures for gaming devices unlikely to be used unnecessarily increases cost for a gaming establishment by using power to operate the gaming devices, power to cool the gaming establishment from the heat generated by the gaming devices, and wastes precious energy.

As the number of electronic gaming devices grow, gaming establishments consumed more energy. As energy costs rise, the increase in cost of operating gaming devices has risen. For example, if the total power consumption of an average gaming device is approximately 300 watts, at $0.10/kwh, it costs a gaming establishment around $300 per year to run the gaming device. For a gaming establishment with 3,000 gaming devices, the power costs could be approximately $900,000. Reducing the power consumption by 35% could save a gaming establishment over $300,000 per year in energy costs alone; indirect savings would also include air conditioning.

SUMMARY

The present disclosure relates to an apparatus, system, and method for reducing power consumption in gaming devices. A power consumption control system enables a gaming operator to reduce electrical power supply to a network of gaming devices and thereby power down the gaming devices. The power consumption control system can also be used in other system configurations such as lighting systems.

In one embodiment, a gaming device may have a memory having a plurality of power management rules and a processor configured to receive a power status from at least one secondary gaming device, retrieve at least one power management rule from the memory, and adjust a power operating state of the primary and/or secondary gaming device based on the power status information received from the at least one secondary gaming device and the at least one power management rule, wherein the gaming device is one of a plurality of gaming devices coupled to a network, wherein the secondary gaming device is another one of the plurality of gaming devices, and wherein the gaming device and the secondary gaming device are proximately located in an establishment and within a predetermined zone within the establishment.

In one embodiment, a system for controlling power consumption in a plurality of gaming devices may have a first gaming device configured to: retrieve a first power control rule from a first memory; configure a power state of the first gaming device based on the first power control rule; and transmit the power state of the first gaming device to a second gaming device. The second gaming device may be configured to: receive the power state of the first gaming device; retrieve a second power control rule from a second memory; and configure a power state of the second gaming device based on the power state of the first gaming device and the second power control rule.

In one embodiment, a method for controlling power consumption in a primary gaming device includes receiving a power operating parameter from at least one secondary gaming device, retrieving, at the primary gaming device, at least one power control rule, and configuring a power operating state of the primary gaming device based on the power state from the at least one secondary gaming device and the at least one power control rule.

Other aspects and advantages of this disclosure will become apparent from the following description, taken in conjunction with the accompanying drawings, illustrated by way of examples, the principles of the disclosure. An embodiment may provide other hardware configured to perform the methods of the invention, as well as software stored in a machine-readable medium (e.g., a tangible storage medium) to control devices to perform these methods. These and other features will be presented in more detail in the following description and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DETAILED DESCRIPTION

Embodiments are described herein in the context of reduced power consumption in a gaming device. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application, regulatory, and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays ("FPGAs"), application specific integrated circuits ("ASICs"), or the like, may also be used without departing from the scope and spirit of the inventive concepts disclosed herein.

A power consumption control system, apparatus, and method to reduce power consumed by a gaming device are described. The reduction of electrical power consumed by one gaming device may result in the reduction of power consumed in a network of gaming devices. Although described with the use of gaming devices, this is not intended to be limiting as the power control system can be used to reduce power consumption in other fields such as in office lights (as described with reference to FIGS. 7 and 8A-8C), outdoor lights, computers, computer monitors, televisions, or any other electrical devices.

Figure 1:
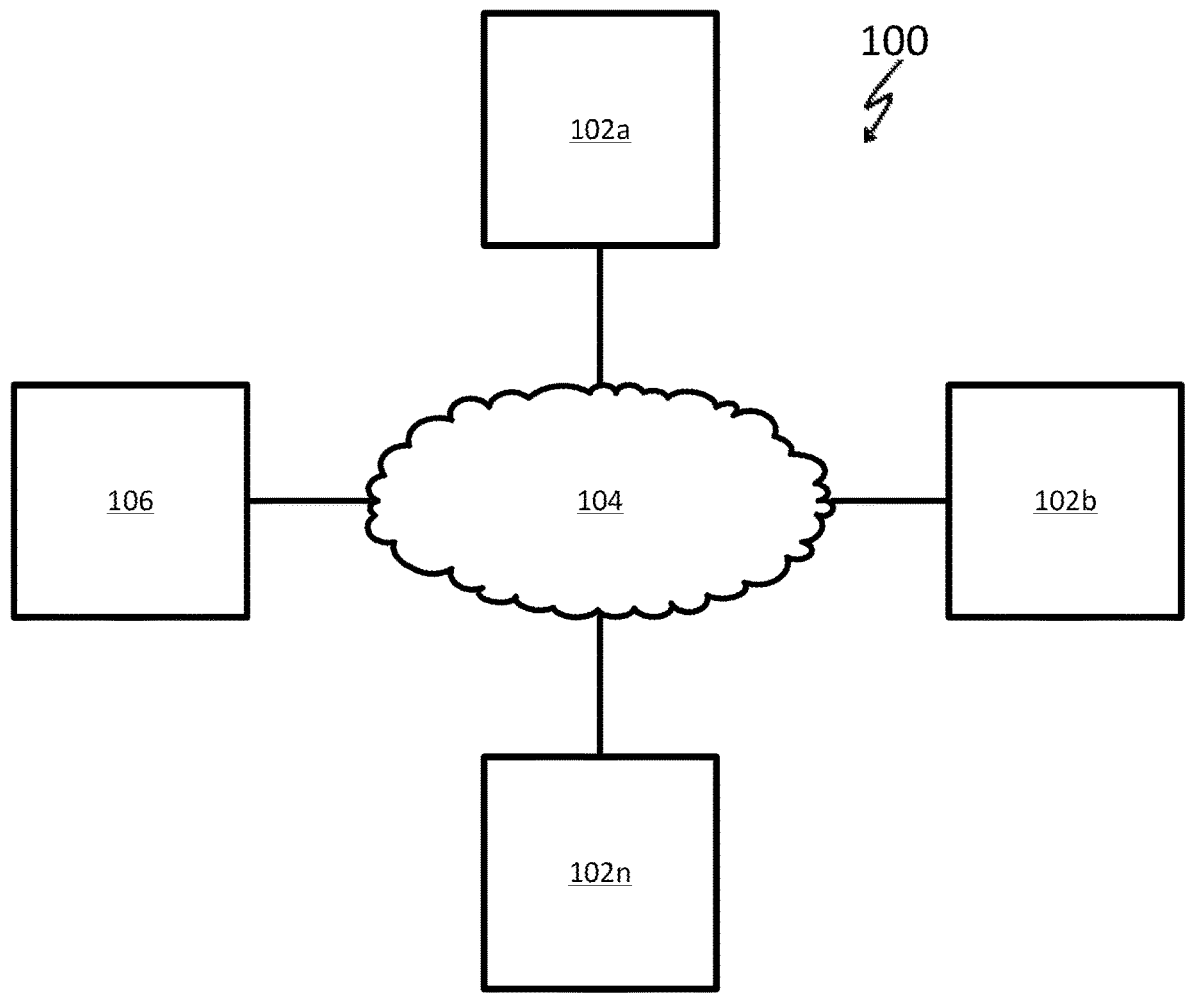
FIG. 1 illustrates a block diagram of one embodiment of a system for reducing power consumption in a gaming device.

FIG. 1 illustrates a block diagram of one embodiment of a system for reducing power consumption in a gaming device. The system may have a plurality of gaming devices or devices 102a-102n (where n is an integer) configured to communicate with each other and a gaming establishment server 106 via network 104. The gaming device 102a-102n may be configured to communicate with each other and the gaming establishment server 106 by any known wireless or wired means. For example, wired implementation may include Ethernet network, Token Ring network, parallel IEEE-488, serial RS-232, serial RS-422, powerline network, and the like. Wireless implementation may include standards such as WiFi 802.11x, Bluetooth, 802.16, Near Field Communication (NFC), cellular GSM or CDMA, and other variants. Further, these communication standards may be implemented on various topologies such as a peer-to-peer network, a local area network (LAN), or a metropolitan area network (MAN) over wired, wireless or optical mediums. The gaming devices 102a-102n may be any known gaming devices, such as slot machines, video poker machines, keno machines, and the like. The gaming establishment server 106 may be any known establishment having gaming devices such as a casino, supermarket, gas station, airport, and the like.

Gaming device 102a-102n may be configured to reduce power consumption automatically or manually. If configured manually, an administrator may manually set a power state for each individual gaming device 102a-102n. In another embodiment, power management rules may be manually configured for each gaming device 102a-102n. The power management rules may be any rule that allocates or controls power provided to each component or peripheral in a gaming device 102a-102n. By providing full power to all peripherals and components of a gaming device 102a-102n, the gaming device may operate in an "Awake" or "On" power state. However, by adjusting or eliminating power supplied to certain peripherals of the gaming device, power consumption of the gaming device may be reduced thereby reducing the overall power consumption in a network of gaming devices.

Power consumption of the gaming device may also be controlled or configured automatically. The gaming devices 102a-102n may communicate with each other, via 104, to set the power states of the other gaming devices. Gaming device 102a may retrieve a power management or power control rule based on the power status information received from gaming device at 102b. The power management rule may be obtained from a power management database such as the power management module and rules database 246 of FIG. 2B. For example, if the power status information contained information that gaming device 102b detected movement 100 feet away, the power status information may also contain power reconfiguration instructions for gaming device 102a to configure itself to assume a "Light Sleep" power state. In another example, if the power status information contained information that gaming device 102b detected no activity for 3 hours, the power status information may also contain power reconfiguration instructions for gaming device 102a to configure itself to a "Hibernate" power state.

Gaming device 102a may determine whether it should change or reconfigure its power state. The determination to adjust its power state may be based upon, for example, the current power state of gaming device 102a. For example, if the current power state of gaming device 102a is an "On" power state, but it must now be configured to operate in a "Hibernate" power state based on the power reconfiguration instructions received from gaming device 102b in the transmitted power status information, gaming device 102a may configure itself to operate in the "Hibernate" power state. In another example, if the current power state of gaming device 102a is a "Hibernate" power state, but it must now reconfigure itself to a "Light Sleep" power state based on the power reconfiguration instructions received from gaming device 102b in the transmitted power status information, gaming device 102a may configure itself to operate in the "Light Sleep" power state. In another example, if the current operating state of gaming device 102a is a "Hibernate" power state and must continue to operate in a "Hibernate" power state based on the power reconfiguration instructions received from gaming device 102b in the received power status information, then gaming device 102a need not adjust its power state. By configuring the gaming device to different power states, the power consumption of each gaming device may be optimized.

Gaming device 102a may then transmit its power status information to a plurality of other gaming devices 102b-102n. For example, if a gaming device was configured to operate in a "Hibernate" power state, the power status information transmitted to the plurality of other gaming device 102n may inform, via 104, the other gaming device 102n that not much activity is occurring and include power reconfiguration instructions for the other gaming device 102n to reconfigure their power states to a "Hibernate" power state. In another example, if gaming device 102a was instructed to operate in an "On" power state due to activity detected on or near gaming device 102b, the power status information transmitted, via 104, to the plurality of other gaming device 102n may inform the other gaming device 102n that patrons are nearby and have power reconfiguration instructions for the other gaming device 102n to reconfigure their power states to an "On" power state. In one embodiment, gaming device 102a may simply forward and transmit, via 104, the power status information received from gaming device 102b.

Figure 2A:
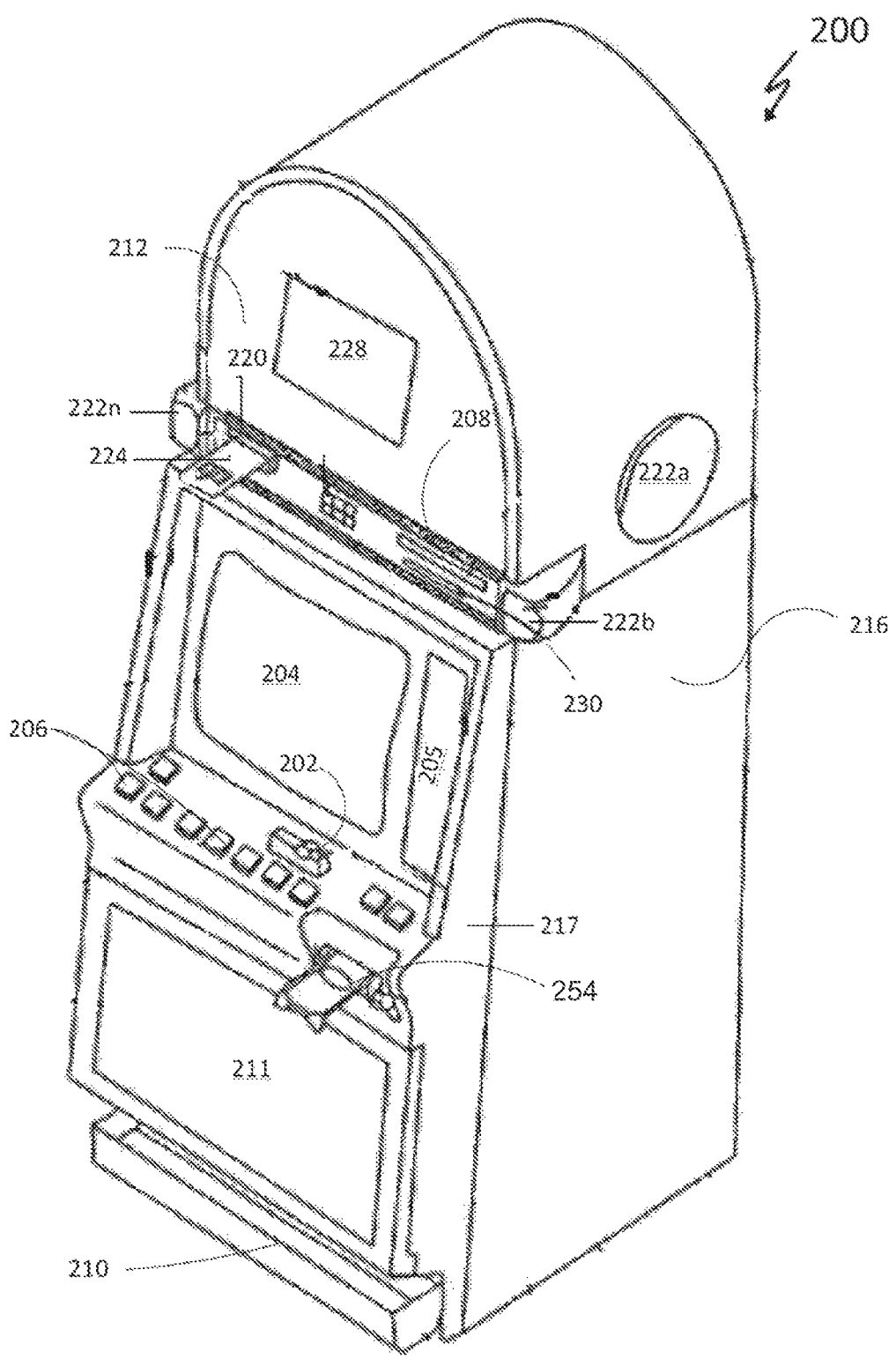
FIG. 2A illustrates a perspective view of one embodiment of a gaming device.
Figure 2B:
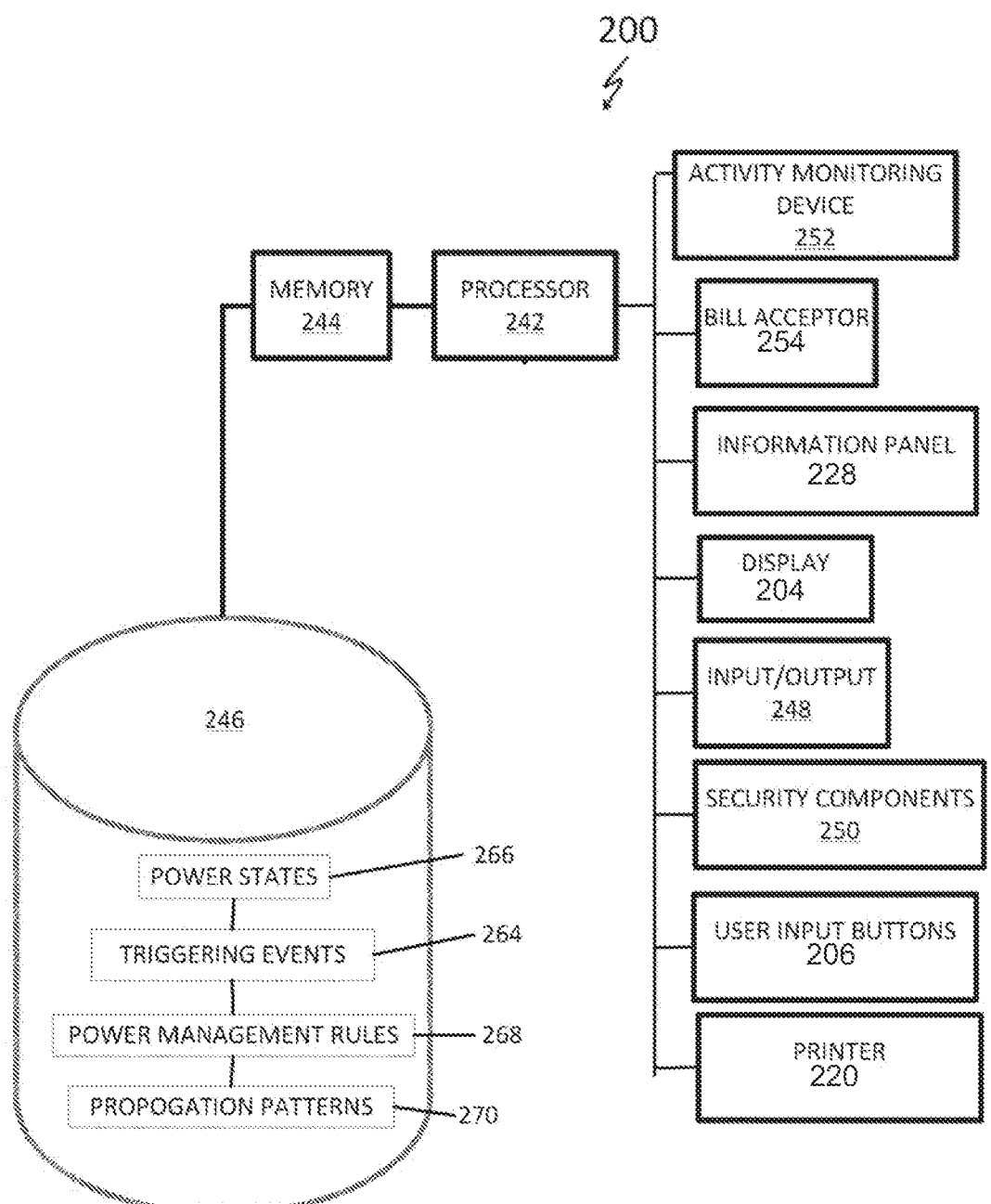
FIG. 2B illustrates an example block diagram of the gaming device illustrated in FIG. 2A.

Determining which gaming device(s) to transmit the power status information may be based upon a propagation pattern stored in a power management database of the gaming device 102a-102n (e.g. power management module and rules database 246 of FIG. 2B). The propagation pattern may be any predefined pattern or instructions instructing a gaming device 102a-102n as to which other gaming devices 102a-102n it may transmit power status information to, via 104. In one example, gaming device 102a may be configured to transmit power status information to other gaming device 102n within the same bank of gaming devices. In another example, gaming device 102a may be configured to transmit power status information to other gaming device 102n within a predefined zone in the gaming establishment. In still another example, gaming device 102a may be configured to transmit power status information to other gaming device 102n immediately neighboring or next to gaming device 102a. Although illustrated with specific examples, it will now be known that various other propagation patterns may be used such as based upon gaming device themes, gaming device manufacturers, and the like.

In one example, a gaming device 102a-102n may be configured to operate at an "Awake" or "On" power state. The "On" power state of the gaming device 102a-102n may supply power to substantially all the peripherals in a gaming device 102a-102n. The "On" power state may be the power state at which gaming devices 102a-102n consumes their greatest power. In another example, a gaming device 102a-102n may be configured to operate in an "Off" power state whereby power may be supplied to a few peripherals a gaming device, such as the gaming device processor, memory, and security peripherals. In still another example, a gaming device 102a-102n may be configured to operate in a "Light Sleep" power state whereby power is supplied to less than substantially all the gaming device peripherals such that the gaming device may quickly be configured back to an "On" power state with very little wait time.

In use, gaming device 102a may transmit, via 104, power status information or power operating parameters to each of the other gaming devices 102b-n. In another embodiment, gaming device 102b may be configured to monitor or "ping", via 104, each of the other gaming devices 102a, 102n for power status information. The power status information or power operating parameter may include any pertinent information such as triggering events, power state, power reconfiguration instruction, detected activity in the gaming environment and the like. For example, the power status information or power operating parameter may inform the other gaming device of the power state at which it is operating at. In another example, the power status information or power operating parameter may include information that the one or more gaming devices nearby detected movement 100 feet away and to instruct the other gaming devices nearby to reconfigure its power state to a "Light Sleep" or a "Wake Up" state.

FIG. 2A illustrates a perspective view of one embodiment of a gaming device. Gaming device 200 may include a main cabinet 216, which generally surrounds the machine components (not shown) and is viewable by players. The main cabinet 216 may include a main door 217 on the front of the machine, which opens to provide access to the interior of the machine. Attached to the main door 217 may be a plurality of player-input switches or buttons 206, a coin acceptor 202, a bill acceptor or validator 254, a coin tray 210, and/or a belly glass 211. Viewable through the main door 217 may be a display monitor 204 and an information panel 205. The display monitor 204 may be any kind of known monitor such as a cathode ray tube, high resolution flat-panel liquid crystal display (LCD), or any other electronically controlled video monitor. The information panel 205 may be a back-lit, silk screened glass panel with lettering to indicate general game information including, for example, a game denomination (e.g. $0.25 or $1). The bill acceptor 254, player-switches 206, display monitor 204, and information panel may be devices used to play a game on the game device 200. The devices may be controlled by circuitry (such as the processor 242 illustrated in FIG. 2B) housed inside the main cabinet 216 of the game device 200.

Many different types of games, including mechanical slot games, video slot games, video poker, video black jack, video pachinko and lottery, may be provided with gaming devices of this invention. In particular, the gaming device 200 may be operable to provide many different instances of wagering games of chance. The type of game may be differentiated according to themes, sounds, graphics, type of game (e.g., slot game vs. card game), denomination, number of paylines, maximum jackpot, progressive or non-progressive, bonus games, and the like. The gaming device 200 may be operable to allow a player to select a game of chance to play from a plurality of wager games available on the gaming device. For example, the gaming device may provide a menu with a list of the wagering games that are available for play on the gaming device and a player may be able to select at least one of the wagering games that one wishes to play.

The gaming device 200 may include a top box 212 on top of the main cabinet 216. The top box 212 may house a number of devices, which may be used to add features to a game being played on the gaming device 200, such as speakers 222a-n, a ticket printer 220 which prints bar-coded or other types of tickets 224, a key pad 226 for entering player tracking information, a florescent display 208 for displaying player tracking information, a card reader 230 for entering a magnetic striped card containing player tracking information, and a display monitor 228. The ticket printer 220 may be used to print tickets for a cashless ticketing system. Further, the top box 212 may house different or additional devices than shown in FIG. 2A. For example, the top box 212 may contain a bonus wheel or a back-lit silk screened panel which may be used to add bonus features to the game being played on the gaming device. As another example, the top box 212 may contain a display for a progressive jackpot offered on the gaming device 200. During a game, these devices may be controlled and powered, in part, by circuitry (such as the processor 242 illustrated in FIG. 2B) housed within the main cabinet 216 of the game device 200.

Gaming device 200 is but one example from a wide range of gaming device designs on which the present invention may be implemented. For example, not all suitable gaming devices have top boxes or player tracking features. Further, some gaming devices have only a single game display—mechanical or video, while others are designed for bar tables and have displays that face upwards. As another example, a game may be generated on a host computer and may be displayed on a remote terminal or a remote gaming device.

Some gaming devices may have different features and/or additional circuitry that differentiates them from general-purpose computers (e.g., desktop personal computers (PCs) and laptops). Gaming devices are highly regulated to ensure fairness and, in many cases, gaming devices are operable to dispense monetary awards of multiple millions of dollars. Therefore, to satisfy security and regulatory requirements in a gaming environment, hardware and software architectures may be implemented in gaming devices that differ significantly from those of general-purpose computers. A description of gaming devices relative to general-purpose computing machines and some examples of the additional (or different) components and features found in gaming devices are described below.

It may appear that adapting PC technologies to the gaming industry would be a simple proposition because both PCs and gaming devices employ microprocessors that control a variety of devices. However, because of such reasons as 1) the regulatory requirements that are placed upon gaming devices, 2) the harsh environment in which gaming devices operate, 3) security requirements and 4) fault tolerance requirements, adapting PC technologies to a gaming device can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming device because in a gaming device these faults can lead to a direct loss of funds from the gaming device, such as stolen cash or loss of revenue when the gaming device is not operating properly.

For the purposes of illustration, a few differences between PC systems and gaming systems will be described. A first difference between gaming devices and common PC based computers systems is that gaming devices are designed to be gaming state-based systems. In a gaming state-based system, the system stores and maintains its current gaming state and previous transactions history in a non-volatile memory, such that, in the event of a power failure or other malfunction the gaming device will return to its current gaming state when the power is restored. For instance, if a player was shown an award for a game of chance and, before the award could be provided to the player the power failed, the gaming device, upon the restoration of power, would return to the gaming state where the award is indicated. As is well known in the field, PCs are generally not gaming state machines and a majority of data is usually lost when a malfunction occurs. This requirement affects the software and hardware design on a gaming device.

A second important difference between gaming devices and common PC based computer systems is that for regulation purposes, the software on the gaming device used to generate the game of chance and operate the gaming device has been designed to be static and monolithic to prevent cheating by the operator of the gaming device. For instance, one solution that has been employed in the gaming industry to prevent cheating and satisfy regulatory requirements has been to manufacture a gaming device that can use a proprietary processor running instructions to generate the game of chance from an EPROM or other form of non-volatile memory. The coding instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burned, approved by the gaming jurisdiction and reinstalled on the gaming device in the presence of a gaming regulator. Regardless of whether the EPROM solution is used, to gain approval in most gaming jurisdictions, a gaming device must demonstrate sufficient safeguards that prevent an operator or player of a gaming device from manipulating hardware and software in a manner that gives them an unfair and in some cases an illegal advantage. The gaming device should have a means to determine if the code it will execute is valid. If the code is not valid, the gaming device must have a means to prevent the code from being executed. The code validation requirements in the gaming industry affect both hardware and software designs on gaming devices.

A third important difference between gaming devices and common PC based computer systems is the variety of devices available for a PC may be greater than on a gaming device, gaming devices still have unique device requirements that differ from a PC, such as device security requirements not usually addressed by PCs. For instance, monetary devices, such as coin dispensers, bill acceptors and ticket printers and computing devices that are used to govern the input and output of cash to a gaming device have security requirements that are not typically addressed in PCs. Therefore, many PC techniques and methods developed to facilitate device connectivity and device compatibility do not address the emphasis placed on security in the gaming industry.

To address some of the issues described above, a number of hardware, software, and firmware components and architectures are utilized in gaming devices that are not typically found in general purpose computing devices, such as PCs. These components and architectures, as described below in more detail, include but are not limited to watchdog timers, voltage monitoring systems, gaming state-based software architecture and supporting hardware, specialized communication interfaces, security monitoring (e.g., various optical and mechanical interlocks) and trusted memory.

A watchdog timer may be used by some gaming devices to provide a software failure detection mechanism. In a normal gaming device operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

In one embodiment, a gaming device may use several power supply voltages to operate portions of the computer circuitry. These may be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out-of-tolerance voltages can cause software malfunction, creating a potential uncontrolled condition in the gaming computer. Some gaming devices may have power supplies with tighter voltage margins than that required by the operating circuitry. In addition, the voltage monitoring circuitry may have two thresholds of control. The first threshold generates a software event that can be detected by the operating software and an error condition is generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

Some gaming devices may include a gaming state machine. Different functions of a game (bet, play, result, stages in the graphical presentation, credit and the like) may be defined as a gaming state. When a game moves from one gaming state to another, critical data regarding the game software is stored in a custom non-volatile memory subsystem. This is critical to ensure the player's wager and credits are preserved and to minimize potential disputes in the event of a malfunction on the gaming device.

In general, a gaming device does not advance from a first gaming state to a second gaming state until critical information that allows the first gaming state to be reconstructed is stored. This feature allows the game to recover operation to the current gaming state of play in the event of a malfunction, loss of power, and the like that occurred just prior to the malfunction. After the gaming state of the gaming device is restored during the play of a game of chance, game play may resume and the game may be completed in a manner that is no different than if the malfunction had not occurred. Typically, battery-backed random-access memory (RAM) devices are used to preserve this critical data although other types of non-volatile memory devices may be employed. These memory devices are not used in typical general-purpose computers.

As described in the preceding paragraph, when a malfunction occurs during a game of chance, the gaming device may be restored to a gaming state in the game of chance just prior to when the malfunction occurred. The restored gaming state may include metering information and graphical information that was displayed on the gaming device in the gaming state prior to the malfunction. For example, when the malfunction occurs during the play of a card game after the cards have been dealt, the gaming device may be restored with the cards that were previously displayed as part of the card game. As another example, a bonus game may be triggered during the play of a game of chance where a player is required to make a number of selections on a display monitor. When a malfunction has occurred after the player has made one or more selections, the gaming device may be restored to a gaming state that shows the graphical presentation at the time just prior to the malfunction, including an indication of selections that have already been made by the player. In general, the gaming device may be restored to any gaming state in a plurality of gaming states that occur in the game of chance that occurs while the game of chance is played or to gaming states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming device and the gaming state of the gaming device (e.g., credits) at the time the game of chance was played. The game history information may be utilized in the event of a dispute. For example, a player may decide that in a previous game of chance that they did not receive credit for an award that they believed they won. The game history information may be used to reconstruct the gaming state of the gaming device prior, during and/or after the disputed game to demonstrate whether the player was correct or not in their assertion.

The gaming devices of the present invention may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits or security components may be configured to detect intrusion into a gaming device of the present invention by monitoring security switches attached to access doors in the slot machine cabinet. Preferably, access violations result in suspension of game play and can trigger additional security operations to preserve the current gaming state of game play. These circuits also function when power is off by use of a battery backup. In power-off operation, these circuits continue to monitor the access doors and peripherals of the slot machine. When power is restored, the gaming device can determine whether any security violations occurred while power was off, e.g., via software for reading status registers. This can trigger event log entries and further data authentication operations by the slot machine software.

Trusted memory devices are preferably included in the gaming device to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, and the like. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the gaming device is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming device environment, modification of the gaming code stored on a mass storage device is strictly controlled and would only be allowed under specific maintenance type events with electronic and physical enablers required. Though this level of security could be provided by software, gaming devices that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 2A, when a player wishes to play gaming device 200, he can insert cash through the coin acceptor 202 or bill acceptor 254. Additionally, the bill acceptor 254 may accept a printed ticket voucher which may be accepted by the bill acceptor 214 as an indicia of credit when a cashless ticketing system is used. At the start of the game, the player may enter player tracking information using the card reader 230, the keypad 226, and the florescent display 208. Further, other game preferences of the player playing the game may be read from a card inserted into the card reader 230. During the game, the player views game information using the video monitor 204. Other game and prize information may also be displayed in the display monitor 228 located in the top box 212.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-switches 206, the display monitor 204 or using some other device which enables a player to input information into the gaming device. In some embodiments, the player may be able to access various game services such as concierge services and entertainment content services using the display monitor 204 and one more input devices.

During certain game events, the gaming device 200 may display visual and auditory effects that can be perceived by the player. These effects add to the excitement of a game, which makes a player more likely to continue playing. Auditory effects include various sounds that are projected by the speakers 222a-n. Visual effects include flashing lights, strobing lights or other patterns displayed from lights on the gaming device 200 or from lights behind the belly glass 211. After the player has completed a game, the player may receive game tokens from the coin tray 210 or a ticket 224 from the printer 220, which may be used for further games or to redeem a prize. Further, the player may receive a ticket 224 for food, merchandise, other items, or even free or discounted games from the printer 220.

FIG. 2B illustrates an example block diagram of the gaming device illustrated in FIG. 2A. Gaming device can have a processor 242, memory 244 (e.g., non-volatile random access memory (NVRAM), RAM, or any other type of memory) including a power management module and rules database 246, and a plurality of peripheral devices. Peripheral devices may include one or more of input/output devices 248, at least one activity monitoring device 252, security components 250, bill acceptor 254, a plurality of player input switches or buttons 206, a bill acceptor information panel 228, at least one display monitor and touch screen 240, printer 220, and the like.

Processor 242 may be configured to manage power supplied to at least one of the peripheral devices and/or components of the gaming device. By managing the power supply to the peripherals and/or components of the gaming device, the amount of power consumed by the gaming device may be reduced and used efficiently. The processor 242 may be configured to manage power supply to the gaming device based on the power management rules set forth in the power management module and rules database 246.

The power management module and rules database 246 comprise a controller, volatile memory such as DRAM, and non-volatile memory such as EPROM, EEPROM, NVRAM, and/or solid state drives. It is connected to the gaming device's peripherals and may be configured to store data in a database. It may also be connected to the gaming device's controller board. Although illustrated with specific examples, it will know be known that other implementations may be used. For instance, the power management module may be implemented entirely by software, a field programmable gate array (FPGA), a programmable logic device (PLD), a custom application-specific integrated circuit (ASIC), or some combinations of these.

The power management module and rules database 246 may store various power states 266. The power states 266 may include, for example, an "On" or "Awake", "Off", "Light Sleep", and/or "Hibernate" power states. Each power state may be defined, for example, by the number of peripherals or components to which power is supplied or denied, the allocation of power to each peripheral or component, and any other criteria.

When configured to operate in an "On" power state, power may be supplied to substantially all gaming components and peripherals of the gaming device. As such, when configured to an "On" power state, the gaming device may consume the most power. When configured to operate in an "Off" power state, the gaming device 200 may be configured to limit or withhold power to substantially all components and peripheral devices of the gaming device except for a few essential components, such as the processor 242, security components 250, memory 244, and any other necessary components or peripheral devices. When operating in the "Off" power state, the gaming device may use the least amount of power.

When configured to operate in a "Light Sleep" power state, power may be supplied to substantially all gaming components and peripherals of the gaming device except for a few peripherals. In one embodiment, a limited amount of power may be supplied to the at least one display monitor and touch screen 204. That is, the duty cycle of the supplied power is reduced to less than 100%. For example, power may be supplied to the at least one display monitor and touch screen 204 in predetermined time intervals and at a high enough frequency or duty cycle (e.g., modulate the voltage pulse width to 80% at 60 Hz frequency for a display that normally refreshes at 120 Hz on full power) such that a player would not notice that the at least one display monitor and touch screen 204 was not receiving full power. As such, the display monitor and touch screen 204 may appear to be turned on, yet less power is supplied to the display monitor and touch screen 204. In another embodiment, a limited amount of power may be supplied to the plurality of player input switches or buttons 206. In still another embodiment, a limited amount of power may be supplied to both the at least one display monitor and touch screen 204, the plurality of player input switches or buttons 206, and the information panel 228. This may provide the appearance that the gaming device is fully functioning if a player wanted to play a wagering game on the gaming device. Additionally, it allows for the display or presentation of information that may lure the player to play the gaming device 200. For example, a poker themed gaming device may display information about an upcoming poker tournament on the information panel 228 to entice the player to play the gaming device. When operating in a "Light Sleep" power state, the gaming device may use less power than operating in an "On" power state, but more power than operating in an "Off" power state. Additionally, only a limited amount of power and time is required for the gaming device to be configured from the "Light Sleep" power state to be fully functioning in an "On" power state. For example, a gaming device operating in an "Off" power state may require approximately 10 minutes to reconfigure itself to an "On" power state (e.g., full O/S reboot and authentication of gaming software) whereas a gaming device operating in a "Light Sleep" power state may require approximately thirty seconds to reconfigure itself to an "On" power state.

Attenuating the duty cycle of the power supplied to the devices and peripherals often work very well without diminishing their performance. However, it may not be necessary in some cases. Many of today's advanced devices and peripherals such as displays, touch screens, printers, power supply, processors, fans, Wifi controller, Bluetooth controller, and the like have built-in processing power and intelligence to simply take high-level commands from a master controller (e.g., the gaming device's CPU board, the gaming device's power management controller, and the like). In one example, the gaming device's controller can send a high-level command "Go To Sleep" to a smart printer to put it in a lower power mode. In one implementation, a hybrid approach can be taken by having both the power attenuation and high-level commands capabilities. In this implementation, the gaming device's power management controller can be designed to have both the hardware for a switching power supply connecting to duty-cycle controlled peripherals, and one or more communication buses (wired or wireless) connecting to smart peripherals and devices.

When configured to operate in a "Hibernate" power state, more power may be supplied to more gaming device peripherals and/or components than operating in the "Off" power state, but less power may be supplied to less gaming device peripherals and/or components than operating in the "Light Sleep" power state. In one embodiment, the gaming device may be configured to operate in the "Hibernate" power state if it is not used within a predetermined amount of time. As such, power to substantially all gaming device peripherals and components may be withheld to conserve energy. In one embodiment, power may be limited or withheld to substantially all components and peripheral devices of the gaming device except for a few essential components, such as the processor 242, security components 250, memory 244, and any other desired components or peripheral devices.

As previously discussed, some smart devices and peripherals can take high-level commands over a communication bus to change their power-operating mode. For instance, when operating in the "Hibernate" power state, the gaming device's power management controller and rules database 246 may send a command "Go To Sleep" to the Wifi controller to put it in a lower power mode.

Triggering events 264 may be stored in the power management module and rules database 246. The triggering events 264 may be any predefined triggering event such as motion detected by at least one of the activity monitoring device 252. The activity monitory device 252 may be any known detection device such as, but not limited to a motion sensor, a camera, a pressure sensor, a metal detector, and the like. The activity monitoring device 252 may be configured to detect activities proximate to the gaming device in the gaming environment, such as patrons walking in close proximity to the gaming device, detecting motion on the player input buttons or switches of the gaming device, detecting motion on the display of the gaming device, and any other type of motion or activity. As such, the triggering events 264 may include, but is not limited to, input from a player input button, a breach in a security component, non-activity for a predetermined time period (i.e. 30 minutes, 1 hour, 3 hours, and the like), detection of motion 100 feet away from the gaming device, detection of motion 25 feet away from the gaming device or a group of gaming devices, and the like.

Based on the triggering event 264, the gaming device may be configured to assume a particular power state 266. The particular power state 266 may be configured to manage power based on various power management rules 268. Although illustrated with specific examples, it will now be known that different power management rules 268 may be utilized. For example, when configured to assume a "Hibernate" power state, the gaming device may be configured to supply power to the security components 250, processor 242, and memory 244. In another example, when configured to assume a "Light Sleep" power state, the gaming device may be configured to supply power to the security components 250, processor 242, memory 244, display and touch screen 240, player input buttons 256, and information panel 228.

The power management module and rules database 246 may also store predefined propagation patterns 270. As discussed above in FIG. 1, a gaming device may be configured to control the power state of another gaming device by transmitting power status information to the another gaming device. The various methods by which the gaming device may transmit the power status information to other gaming devices may be stored in the power management module and rules database 246 as propagation patterns 270. In one example, the gaming device may be configured to transmit power status information to other gaming devices within the same bank of gaming devices. In another example, the gaming device may be configured to transmit power status information to gaming devices within a predefined zone in the gaming establishment. In still another example, the gaming device may be configured to transmit power status information to other gaming devices immediately neighboring or next to the gaming device. Although illustrated with specific examples, it will now be known that various other propagation patterns may be used such as based upon gaming device themes, gaming device manufacturers, and the like.

Table 1 illustrates example data that may be stored in the power management module and rules database 246.

| TRIGGERING EVENTS 264 | POWER STATES 266 | POWER MANAGEMENT/CONTROL RULES 268 | PROPAGATION PATTERNS 270 |
| --- | --- | --- | --- |
| Receive input from player input button or switch | ON/AWAKE | Provide power to all peripherals and components | All gaming devices in the same bank of gaming devices |
| Detect security component breach | OFF | Provide no power to all peripherals and components | Gaming devices immediately next to the gaming device |
| Non-activity within 30 minutes | LIGHT SLEEP | Provide power to processor, memory, security components, display, player input buttons, and information panel | Gaming devices within the same zone |
| Non-activity within 2 hours | HIBERNATE | Provide power to processor, memory, security components | Gaming devices within the same zone |
| Detect motion within 100 feet | LIGHT SLEEP | Provide power to processor, memory, security components, display, player input buttons, and information panel | Gaming devices within the same zone |
| Detect motion within 25 feet | ON | Provide power to all peripherals and components | All gaming devices in the same bank of gaming devices |

Figure 3:
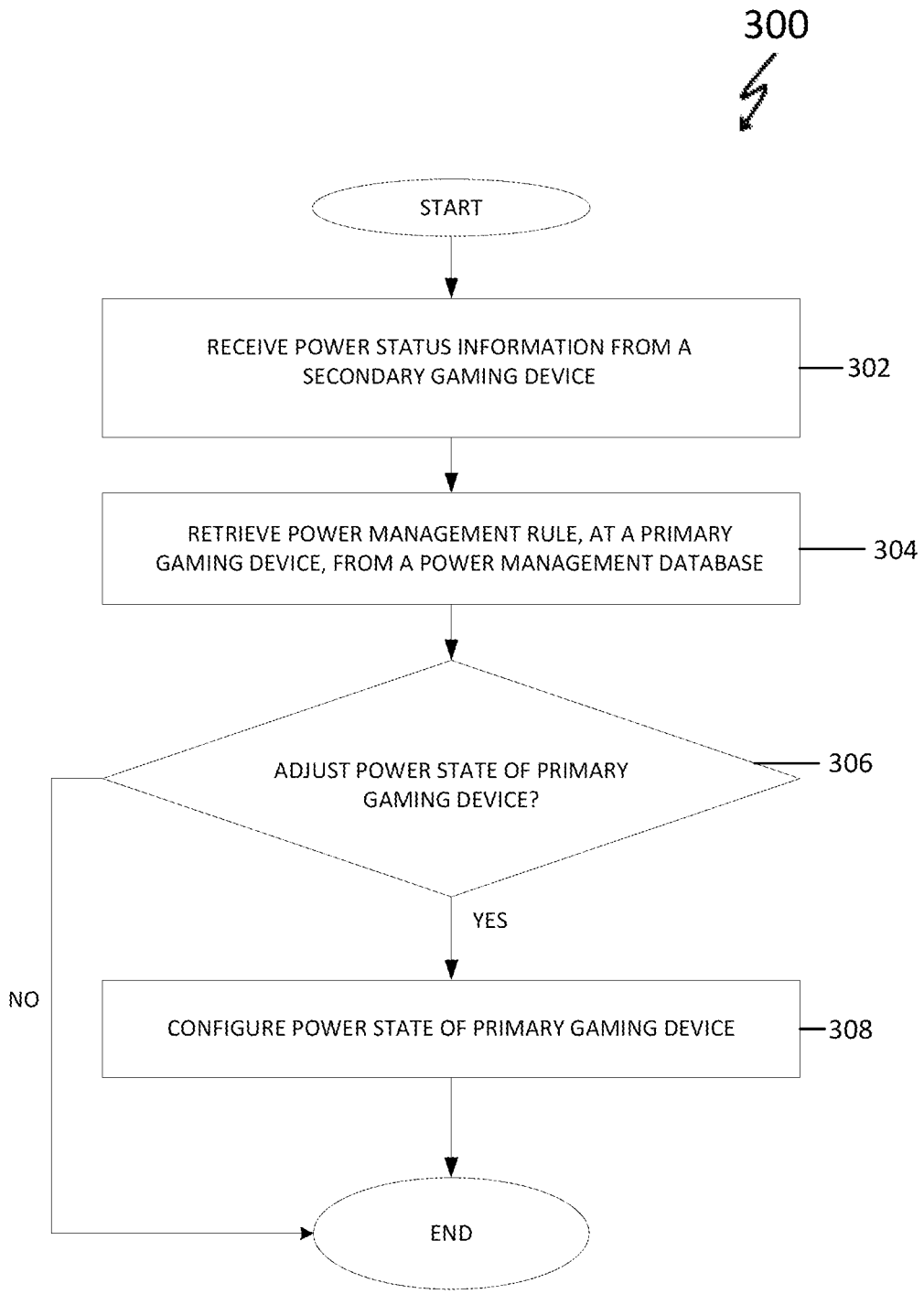
FIG. 3 illustrates a flow diagram of an embodiment of a method for reducing power consumption in a network of gaming devices.

FIG. 3 illustrates a flow diagram of an embodiment of a method for reducing power consumption in a network of gaming devices. The method 300 initially provides for a primary gaming device to receive power status information from a secondary gaming device at 302. The power status information may include any pertinent information such as triggering events, power state, power reconfiguration instruction, detected activity in the gaming environment and the like. For example, the power status information may inform the primary gaming device the power state at which the secondary gaming device is operating at. In another example, the power status information may include information that the secondary gaming device detected movement 100 feet away and include power reconfiguration instructions instructing the primary gaming device to reconfigure its power state to a "Light Sleep" state.

The power states may include, for example, an "On" or "Awake", "Off", "Light Sleep", and/or "Hibernate" power states. Each power states may be defined, for example, by the number of peripherals or components to which power is supplied or denied, the allocation of power to each peripheral or component, and any other criteria.

When configured to operate in an "On" power state, power may be supplied to substantially all gaming components and peripherals of the gaming device. As such, when configured to an "On" power state, the gaming device may consume the most power. When configured to operate in an "Off" power state, the gaming device 200 may be configured to limit or withhold power to substantially all components and peripheral devices of the gaming device except for a few essential components, such as the processor, security components, and any other desired components or peripheral devices. When operating in the "Off" power state, the gaming device may use the least amount of power.

When configured to operate in a "Light Sleep" power state, power may be supplied to substantially all gaming components and peripherals of the gaming device except for a few peripherals. In one embodiment, a limited amount of power may be supplied to the at least one display monitor. For example, power may be supplied to the at least one display monitor in predetermined time intervals and at a high enough frequency or duty cycle (e.g., modulate the voltage pulse width to 80% at 60 Hz frequency for a display that normally refreshes at 120 Hz on full power) such that a player would not notice that at least one display monitor was not receiving full power. As such, the display monitor may appear to be turned on, yet less power is supplied to the display monitor. In another embodiment, a limited amount of power may be supplied to the plurality of player input switches or buttons. In still another embodiment, a limited amount of power may be supplied to both the at least one display monitor, the plurality of player input switches or buttons, and the information panel. This may provide the appearance that the gaming device is fully functioning if a player wanted to play a wagering game on the gaming device. Additionally, it allows for the display or presentation of information that may lure the player to play the gaming device. For example, a poker themed gaming device may display information about an upcoming poker tournament on the information panel to entice the player to play the gaming device. When operating in a "Light Sleep" power state, the gaming device may use less power than operating in an "On" power state, but more power than operating in an "Off" power state. Additionally, only a limited amount of power and time is required for the gaming device to be configured from the "Light Sleep" power state to be fully functioning in an "On" power state. For example, a gaming device operating in an "Off" power state may require approximately 10 minutes to reconfigure itself to an "On" power state (full operating system reboot and gaming software authentication) whereas a gaming device operating in a "Light Sleep" power state may require approximately 30 seconds to reconfigure itself to an "On" power state.

Attenuating the duty cycle of the power supplied to the devices and peripherals often work very well without diminishing their performance. However, it may not be necessary in some cases. Many of today's advanced devices and peripherals such as displays, touch screens, printers, power supply, processors, fans, Wifi controller, Bluetooth controller, and the like have built-in processing power and intelligence to simply take high-level commands from a master controller (e.g., the gaming device's CPU board, the gaming device's power management controller, and the like). In one example, the gaming device's controller can send a high-level command "Go To Sleep" to a smart printer to put it in a lower power mode. In one implementation, a hybrid approach can be taken by having both the power attenuation and high-level commands capabilities. In this implementation, the gaming device's power management controller can be designed to have both the hardware for a switching power supply connecting to duty-cycle controlled peripherals, and one or more communication buses (wired or wireless) connecting to smart peripherals and devices.

When configured to operate in a "Hibernate" power state, power may be supplied to more gaming device peripherals and/or components than operating in the "Off" power state, but substantially less gaming device peripherals and/or components than operating in the "Light Sleep" power state. In one embodiment, the gaming device may be configured to operate in the "Hibernate" power state if it is not used within a predetermined amount of time. As such, power to substantially all gaming device peripherals and components may be withheld to conserve energy. In one embodiment, power may be limited or withheld to substantially all components and peripheral devices of the gaming device except for a few essential components, such as the processor, security components, memory, and any other components or peripheral devices.

As previously discussed, some smart devices and peripherals can take high-level commands over a communication bus to change their power-operating mode. For instance, when operating in the "Hibernate" power state, the gaming device's power management controller and rules database 246 may send a command "Go To Sleep" to the Wifi controller to put it in a lower power mode.

Triggering events may be stored in the power management module and rules database. The triggering events may be any predefined triggering event such as motion detected by at least one of the activity monitoring devices. The activity monitory device may be any known detection device such as, but not limited to a motion sensor, a camera, a pressure sensor, a metal detector, and the like. The activity monitoring device may be configured to detect activities proximate to the gaming device in the gaming environment, such as patrons walking in close proximity to the gaming device, detecting motion on the player input buttons or switches of the gaming device, detecting motion on the display of the gaming device, and any other type of motion or activity. As such, the triggering events may include, but is not limited to, input from a player input button, a breach in a security component, non-activity for a predetermined time period (i.e. 30 minutes, 1 hour, 3 hours, and the like), detection of motion 100 feet away from the gaming device, detection of motion 25 feet away from the gaming device, and the like.

Based on the triggering event, the gaming device may be configured to assume a particular power state. The particular power state may be configured to manage power based on various power management rules. Although illustrated with specific examples, it will now be known that different power management rules may be utilized. For example, when configured to assume a "Hibernate" power state, the gaming device may be configured to supply power to the security components, processor, and memory. In another example, when configured to assume a "Light Sleep" power state, the gaming device may be configured to supply power to the security components, processor, memory, display, player input buttons, and information panel.

Based on the information received from the secondary gaming device at 302, the primary gaming device may obtain a power management or power control rule from a power management database (e.g. the power management module and rules database 246 of FIG. 2B) at 304. For example, if the power status information contained information that the secondary gaming device detected movement 100 feet away, the primary gaming device may be configured to assume a "Light Sleep" power state. In another example, if the power status information contained information that the secondary gaming device detected no activity for three hours, the primary gaming device may be configured to assume a "Hibernate" power state.

If it is determined that the primary gaming device should adjust its power state at 306, the power state of the primary gaming device may be changed or configured at 308. The determination to adjust its power state may be based upon, for example, the current power state of the primary gaming device. For example, if the primary gaming device was operating at an "On" power state and must now change to a "Hibernate" power state based on the power status information received from the secondary gaming device, the primary gaming device may configure itself to operate in the "Hibernate" power state. In another example, if the primary gaming device was operating at a "Hibernate" power state and must now change to a "Light Sleep" power state based on the power status information received from the secondary gaming device, the primary gaming device may configure itself to operate in the "Light Sleep" power state. In another example, if the primary gaming device was operating at a "Hibernate" power state and, based on the power status information received from the secondary gaming device, must remain in the "Hibernate" power state, the primary gaming device need not adjust its power state at 306. By configuring the gaming device to different power states, the power consumption of the gaming device may be optimized and thus reduce operation costs.

Figure 4:
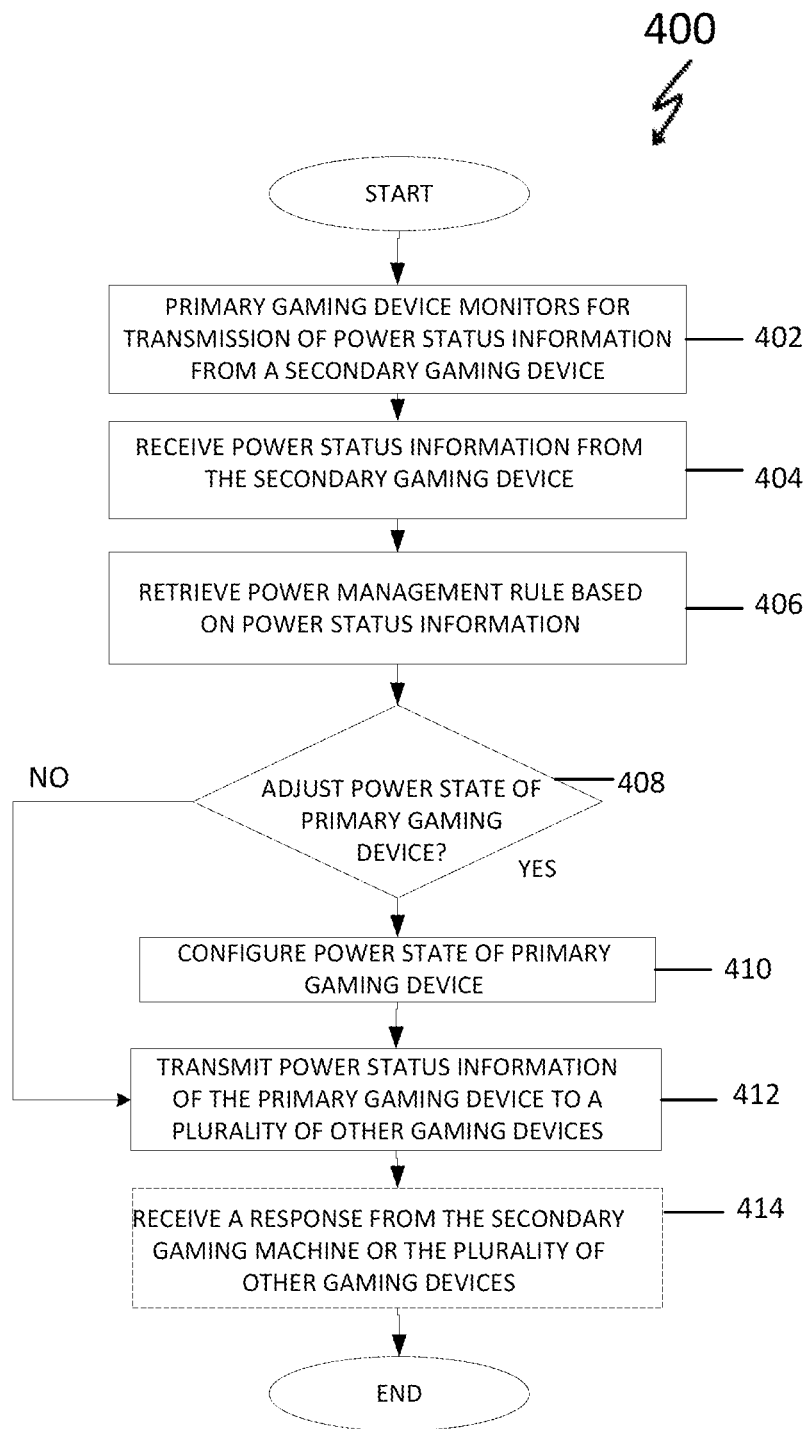
FIG. 4 illustrates a flow diagram of another embodiment of a method for reducing power consumption in a network of gaming devices.

FIG. 4 illustrates a flow diagram of another embodiment of a method for reducing power consumption in a network of gaming devices. In the method 400, at 402, the primary gaming device may monitor for the receipt or transmission of power status information from a secondary gaming device. For example, the primary gaming device may contact or ping the secondary gaming device for power status information in predetermined time intervals such as every hour or 30 minutes. In another embodiment, the secondary gaming device may be configured to transmit power status information to the primary gaming device in predetermined time interval such as every ten minutes, every 30 minutes, or any other predetermined interval. The power status information may include any pertinent information such as triggering events, power state as discussed above, power reconfiguration instructions, and the like. For example, the power status information may inform the primary gaming device the power state at which the secondary gaming device is operating at. In another example, the power status information may include information that the secondary gaming device detected movement 100 feet away and to instruct the primary gaming device to reconfigure its power state to a "Light Sleep" state.

Once the primary gaming device receives a power status information transmission from the secondary gaming device at 404, the primary gaming device may retrieve a power management or power control rule based on the power status information received from the secondary gaming device at 406. The power management rule may be obtained from a power management database such as the power management module and rules database 246 of FIG. 2B. For example, if the power status information contained information that the secondary gaming device detected movement 100 feet away, the power status information may also contain power reconfiguration instructions for the primary gaming device to configure itself to assume a "Light Sleep" power state. In another example, if the power status information contained information that the secondary gaming device detected no activity for 3 hours, the power status information may also contain power reconfiguration instructions for the primary gaming device to configured itself to a "Hibernate" power state.

If it is determined that the primary gaming device should adjust its power state at 408, the power state of the primary gaming device may be changed or configured at 410. The determination to adjust its power state may be based upon, for example, the current power state of the primary gaming device. For example, if the current power state of the primary gaming device is an "On" power state, but it must now be configured to operate in a "Hibernate" power state based on the power reconfiguration instructions received from the secondary gaming device in the transmitted power status information, the primary gaming device may configure itself to operate in the "Hibernate" power state. In another example, if the current power state of the primary gaming device is a "Hibernate" power state, but it must now reconfigure itself to a "Light Sleep" power state based on the power reconfiguration instructions received from the secondary gaming device in the transmitted power status information, the primary gaming device may configure itself to operate in the "Light Sleep" power state. In another example, if the current operating state of the primary gaming device is a "Hibernate" power state and must continue to operate in a "Hibernate" power state based on the power reconfiguration instructions received from the secondary gaming device in the received power status information, then the primary gaming device need not adjust its power state at 408. By configuring the gaming device to different power states, the power consumption of the gaming device may be optimized and thus reduce operation costs.

The primary gaming device may then transmit its power status information to a plurality of other gaming devices at 412. For example, if the primary gaming device was configured to operate in a "Hibernate" power state, the power status information transmitted to the plurality of other gaming devices may inform the other gaming devices that not much activity is occurring and include power reconfiguration instructions for the other gaming devices to reconfigure their power states to a "Hibernate" power state. In another example, if the primary gaming device was instructed to operate in an "On" power state due to activity detected on the secondary gaming device, the power status information transmitted to the plurality of other gaming devices may inform the other gaming devices that patrons are nearby and have power reconfiguration instructions for the other gaming devices to reconfigure their power states to an "On" power state. In one embodiment, the primary gaming device may simply forward and transmit the power status information received from the secondary gaming device.

Determining where to transmit the power status information may be based upon a propagation pattern stored in a power management database of the primary gaming device (e.g. power management module and rules database 246 of FIG. 2B). The propagation pattern may be any predefined pattern or instructions instructing a gaming device as to which other gaming devices it may transmit power status information to. In one example, the primary gaming device may be configured to transmit power status information to other gaming devices within the same bank of gaming devices. In another example, the primary gaming device may be configured to transmit power status information to other gaming devices within a predefined zone in the gaming establishment. In still another example, the primary gaming device may be configured to transmit power status information to other gaming devices immediately neighboring or next to the primary gaming device. Although illustrated with specific examples, it will now be known that various other propagation patterns may be used such as based upon gaming device themes, gaming device manufacturers, and the like.

In one embodiment, the primary gaming device may receive a response from the secondary gaming device or the plurality of other gaming devices at 414. For example, the response may be a confirmation of receipt of the power status information transmitted from the primary gaming device. In another example, the response may be a confirmation that the secondary gaming device and/or the plurality of other gaming devices reconfigured their power states as instructed by the primary gaming device. In yet another example, the response may be that one of the other gaming devices has not detected any motion for several hours and will not reconfigure itself to an "On" power status as instructed by the primary gaming device.

Figure 5:
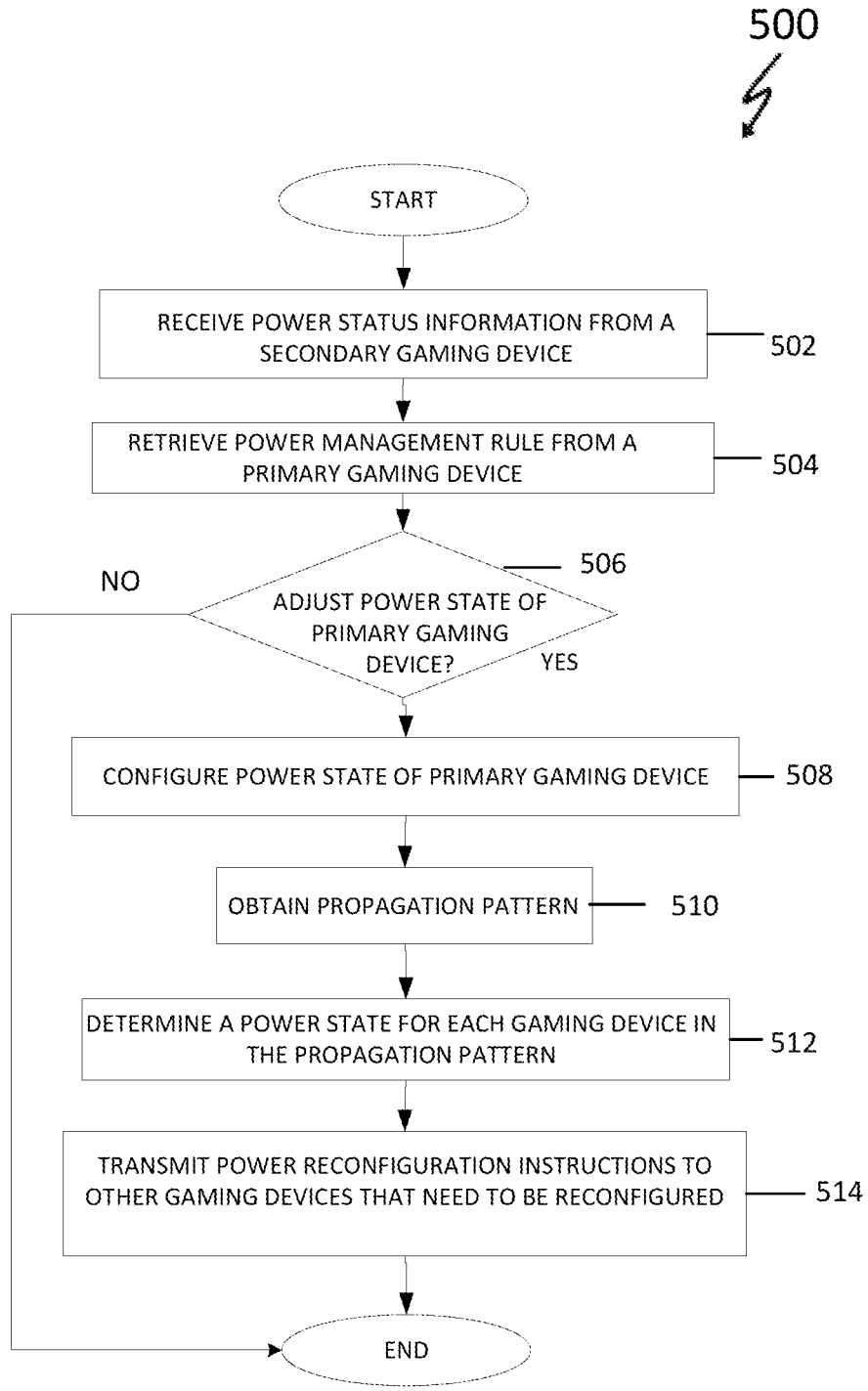
FIG. 5 illustrates a flow diagram of yet another embodiment of a method for reducing power consumption in a network of gaming devices.

FIG. 5 illustrates a flow diagram of yet another embodiment of a method for reducing power consumption in a network of gaming devices. The method for reducing power consumption in a network of gaming devices 500 may initially begin with receiving, at a primary gaming device, power status information from a secondary gaming device at 502. The power status information may include any pertinent information such as triggering events, power state as discussed above, power reconfiguration instruction, detected activity in the gaming environment, and the like. For example, the power status information may inform the primary gaming device the power state at which the secondary gaming device is operating at. In another example, the power status information may include information that the secondary gaming device detected movement 100 feet away and include power reconfiguration instructions instructing the primary gaming device to reconfigure its power state to a "Light Sleep" state.

The primary gaming device may retrieve a power management or power control rule at 504 based on the power status information received from the secondary gaming device. The power management rule may be obtained from a power management database such as the power management module and rules database 246 of FIG. 2B. For example, if the power status information contained information that the secondary gaming device detected movement 100 feet away, the power status information may also contain power reconfiguration instructions for the primary gaming device to configure itself to assume a "Light Sleep" power state. In another example, if the power status information contained information that the secondary gaming device detected no activity for three hours, the power status information may also contain power reconfiguration instructions for the primary gaming device to configured itself to a "Hibernate" power state.

If it is determined that the primary gaming device should adjust its power state at 506, the power state of the primary gaming device may be changed or configured at 508. The determination to adjust its power state may be based upon, for example, the current power state of the primary gaming device. For example, if the current power state of the primary gaming device is an "On" power state, but it must now be configured to operate in a "Hibernate" power state based on the power reconfiguration instructions received from the secondary gaming device in the transmitted power status information, the primary gaming device may configure itself to operate in the "Hibernate" power state. In another example, if the current power state of the primary gaming device is a "Hibernate" power state, but it must now reconfigure itself to a "Light Sleep" power state based on the power reconfiguration instructions received from the secondary gaming device in the transmitted power status information, the primary gaming device may configure itself to operate in the "Light Sleep" power state. In another example, if the current operating state of the primary gaming device is a "Hibernate" power state and must continue to operate in a "Hibernate" power state based on the power reconfiguration instructions received from the secondary gaming device in the received power status information, then the primary gaming device need not adjust its power state at 408. By configuring the gaming device to different power states, the power consumption of the gaming device may be optimized and thus reduce operation costs.

A propagation pattern may be obtained or retrieved at 510. In one implementation, the propagation pattern may be obtained from the transmitting gaming device (e.g., the secondary gaming device). The propagation pattern may be stored in a power management database of the primary gaming device (e.g. power management module and rules database 246 of FIG. 2B). The propagation pattern may be any predefined pattern or instructions instructing a gaming device as to which other gaming devices it may transmit power status information to. In one example, the primary gaming device may be configured to transmit power status information to other gaming devices within the same bank of gaming devices. In another example, the primary gaming device may be configured to transmit power status information to other gaming devices within a predefined zone in the gaming establishment. In still another example, the primary gaming device may be configured to transmit power status information to other gaming devices immediately neighboring or next to the primary gaming device. Although illustrated with specific examples, it will now be known that various other propagation patterns may be used such as based upon gaming device themes, gaming device manufacturers, and the like.

Once the propagation pattern is obtained or retrieved at 510, the primary gaming device may determine the power state for each gaming device in the propagation pattern at 512. In one example, the primary gaming device may ping the other gaming devices for power status information. In another embodiment, the other gaming devices in the propagation pattern may be configured to transmit power status information to the primary gaming device at predefined time intervals, such as every hour. In yet another implementation, the primary gaming device (the source) may forward its power state to other gaming devices in the propagation pattern, and let the receiving gaming devices determine their own power setting according to their own rules.

Once the power state of each gaming device is determined at 512, the primary gaming device may transmit power reconfiguration instructions to the gaming devices that need to be reconfigured at 514. For example, the secondary gaming device may have instructed the primary gaming device to reconfigure itself to an "On" power state because the second gaming device detected patrons in close proximity to the bank of gaming devices (e.g. within approximately 100-200 feet away from the bank of gaming devices). Thus, the primary gaming device may transmit a power reconfiguration instruction to any other gaming devices that are not already in an "On" power state. In another example, the secondary gaming device may have instructed the primary gaming device to reconfigure itself to a "Light Sleep" power state because the second gaming device detected no activity for 30 minutes. Thus, the primary gaming device may transmit a power reconfiguration instruction to any other gaming devices in the propagation pattern that are not in a "Light Sleep" power state.

Figure 6A:
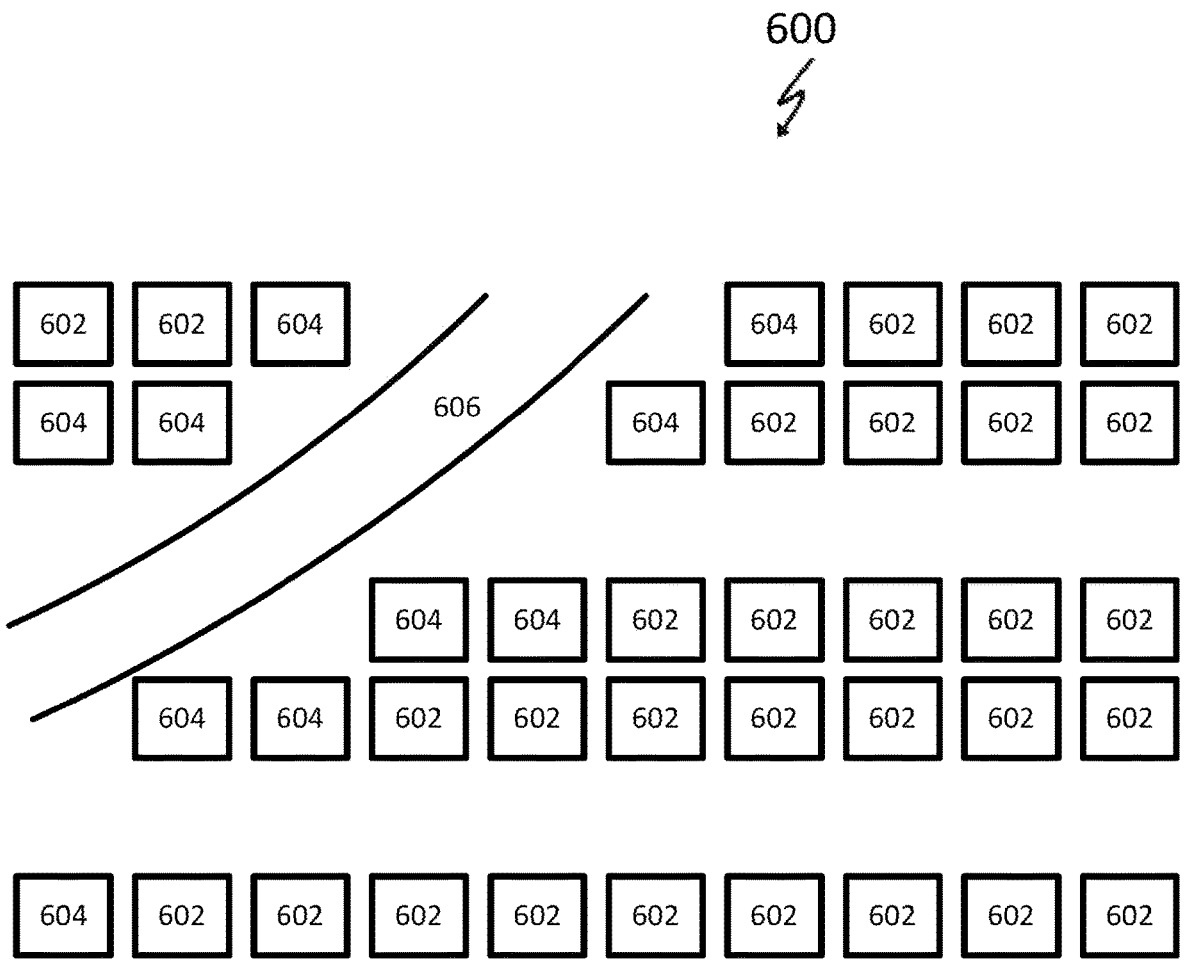
FIGS. 6A-6E illustrate diagrams of an example gaming establishment having a network of gaming devices.

FIGS. 6A-6E illustrate diagrams of an example gaming establishment having a network of gaming devices. FIG. 6A illustrates a gaming establishment floor layout. The gaming establishment 600 may have a walkway 606, plurality of boundary gaming devices 604 located or positioned proximate to or near the walkway 606, and a plurality of gaming devices 602 away from the walkway 606. The walkway 606 may be any walkway created for patrons to move through the gaming establishment. Thus, the boundary gaming devices 604 along the walkway 606 may be more likely to be exposed to patrons. As such, the boundary gaming devices 604 may be configured to continually maintain or operate in an "On" power state. This allows the gaming establishment to create a lively, bright, stimulating, and welcoming environment and may give the appearance that the other gaming devices 602 are also operating in an "On" power state, when in fact they may not be.

In one embodiment, the boundary gaming devices 604 may be configured to not respond to any power reconfiguration instructions received in a power status information. This may prevent boundary gaming devices 604 from shutting down and/or have an appearance of being turned off. Since the boundary gaming devices 604 are exposed to patrons walking along the walkway 606, they are more likely to be played compared to the other gaming devices 602 and need to constantly be maintained in an "On" power state.

Figure 6B:
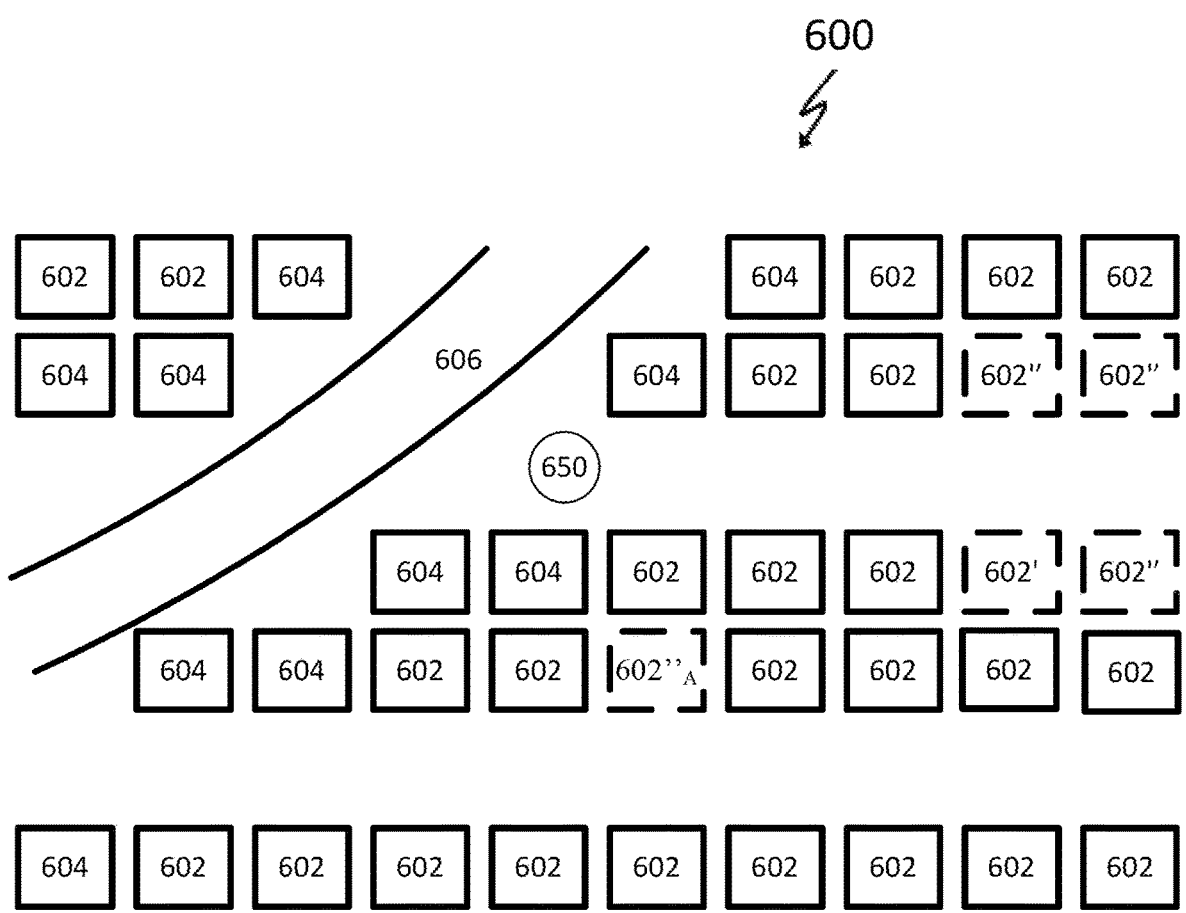

As illustrated in FIG. 6A, each gaming device 602, 604 in a gaming establishment typically operates in an "On" power state thereby consuming the maximum amount of power. Referring to FIG. 6B, primary gaming device 602' may receive power status information from secondary gaming device 602". Although illustrated with 602' being the primary gaming device and 602" as the secondary gaming device, this is for exemplary purposes only and not intended to be limiting as any of the gaming devices 604, 602 may be designated as the primary and secondary gaming devices. For example, primary gaming device 602' may receive power status information from secondary gaming device 602"A.

The power status information may include any pertinent information such as triggering events, power state as discussed above, power reconfiguration instruction, detected activity in the gaming environment, and the like. For example, the power status information may inform the primary gaming device 602' the power state at which the secondary gaming device 602" is operating at. In another example, the power status information may include information that the secondary gaming device 602" detected patron 650 movement 100 feet away (or in close proximity to the secondary gaming device 602") and include power reconfiguration instructions instructing the primary gaming device 602' to reconfigure its power state to a "Light Sleep" state.

The primary gaming device 602' may retrieve a power management or power control rule based on the power status information received from the secondary gaming device 602". The power management rule may be obtained from a power management database such as the power management module and rules database 246 of FIG. 2B. For example, if the power status information contained information that the secondary gaming device 602" detected patron 650 movement 100 feet away (or in close proximity to the secondary gaming device 602" such as within 50 feet of the gaming device 602"), the power status information may also contain power reconfiguration instructions for the primary gaming device 602' to configure itself to assume a "Light Sleep" power state. In another example, if the power status information contained information that the secondary gaming device 602" detected no activity for several hours, the power status information may also contain power reconfiguration instructions for the primary gaming device 602' to configured itself to a "Hibernate" power state.

If it is determined that the primary gaming device 602' should adjust its power state, the power state of the primary gaming device 602' may be changed or reconfigured. The determination to adjust its power state may be based upon, for example, the current power state of the primary gaming device 602'. For example, if the current power state of the primary gaming device 602' is an "On" power state, but it must now be configured to operate in a "Hibernate" power state based on the power reconfiguration instructions received from the secondary gaming device 602" in the transmitted power status information, the primary gaming device 602' may configure itself to operate in the "Hibernate" power state. In another example, if the current power state of the primary gaming device 602' is a "Hibernate" power state, but it must now reconfigure itself to a "Light Sleep" power state based on the power reconfiguration instructions received from the secondary gaming device 602" in the transmitted power status information, the primary gaming device 602' may configure itself to operate in the "Light Sleep" power state. In another example, if the current operating state of the primary gaming device 602' is a "Hibernate" power state and must continue to operate in a "Hibernate" power state based on the power reconfiguration instructions received from the secondary gaming device 602" in the received power status information, then the primary gaming device 602' need not adjust its power state. By configuring the gaming device to different power states, the power consumption of the gaming device may be optimized, thus reduce operating costs.

The primary gaming device 602' may have a propagation pattern stored in a power management database (such as the power management module and rules database 246 of FIG. 2B). The propagation pattern may be any predefined pattern or instructions instructing a gaming device as to which other gaming devices it may transmit power status information to. In one example, the primary gaming device 602' may be configured to transmit power status information to other gaming devices within the same bank of gaming devices. In another example, the primary gaming device 602' may be configured to transmit power status information to other gaming devices within a predefined zone in the gaming establishment. In still another example, the primary gaming device 602' may be configured to transmit power status information to other gaming devices immediately neighboring or next to the primary gaming device 602'. Although illustrated with specific examples, it will now be known that various other propagation patterns may be used such as based upon gaming device themes, gaming device manufacturers, and the like.

Figure 6C:
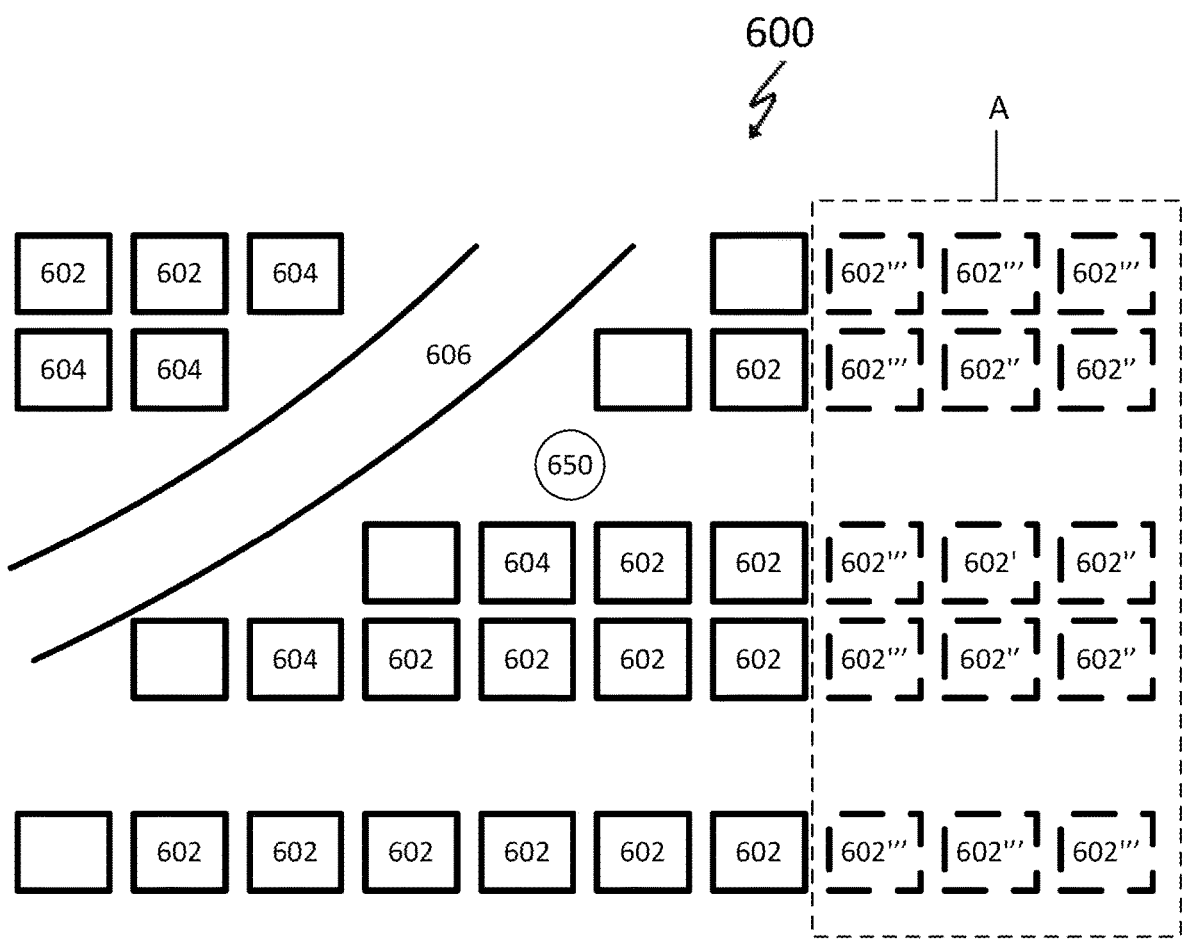

Once the propagation pattern is obtained or retrieved, the primary gaming device 602' may transmit its power status information to a plurality of other gaming devices 602''' in the propagation pattern as illustrated in FIG. 6C. In one example, the propagation pattern may be a predefined zone A in the gaming establishment. For example, if the primary gaming device 602' was configured to operate in a "Hibernate" power state, the power status information transmitted to the plurality of other gaming devices 602''' may inform the other gaming devices 602''' that not much activity is occurring and include power reconfiguration instructions for the other gaming devices 602''' to reconfigure their power states to a "Hibernate" power state. In another example, if the primary gaming device 602' was instructed to operate in an "On" power state due to activity detected on the secondary gaming device 602", the power status information transmitted to the plurality of other gaming devices 602''' may inform the other gaming devices 602''' that patrons 650 are nearby and have power reconfiguration instructions for the other gaming devices 602''' to reconfigure their power states to an "On" power state. In one embodiment, the primary gaming device 602' may simply forward and transmit the power status information received from the secondary gaming device 602".

Figure 6D:
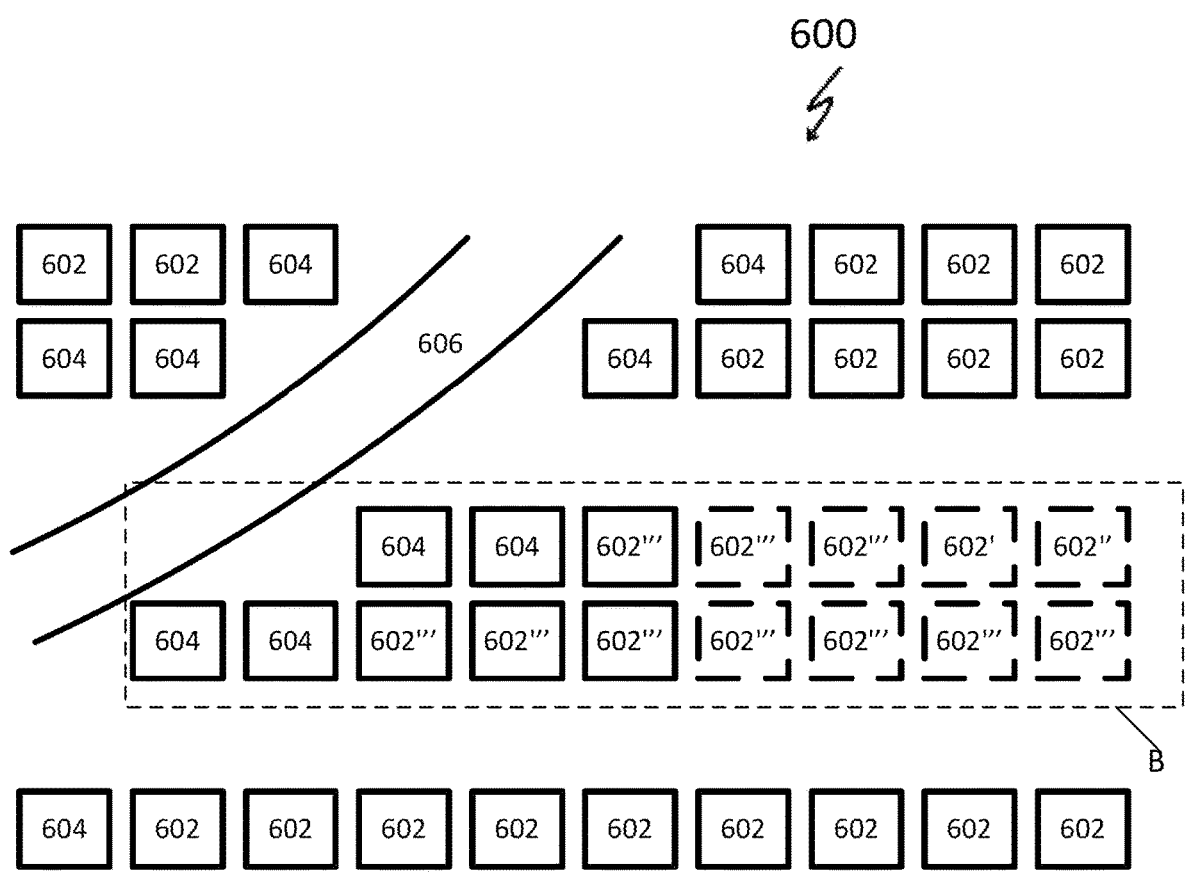

FIG. 6D illustrates another example propagation pattern. The propagation pattern may be predefined as the gaming devices within the bank of gaming devices B. Primary gaming device 602' may transmit its power status information to a plurality of other gaming devices 602''' in the same bank of gaming devices B. For example, if the primary gaming device 602' was configured to operate in a "Hibernate" power state, the power status information transmitted to the plurality of other gaming devices 602''' may inform the other gaming devices 602''' that not much activity is occurring and include power reconfiguration instructions for the other gaming devices 602''' to reconfigure their power states to a "Hibernate" power state. In another example, if the primary gaming device 602' was instructed to operate in an "On" power state due to activity detected on the secondary gaming device 602", the power status information transmitted to the plurality of other gaming devices 602''' may inform the other gaming devices 602''' that patrons 650 are nearby and have power reconfiguration instructions for the other gaming devices 602''' to reconfigure their power states to an "On" power state. In one embodiment, the primary gaming device 602' may simply forward and transmit the power status information received from the secondary gaming device 602".

In another embodiment, the primary gaming device 602' may determine the power state for each of the other gaming devices 602''' in the propagation pattern B. In one example, the primary gaming device 602' may ping the other gaming devices 602' for power status information. In another embodiment, the other gaming devices 602''' in the propagation pattern B may be configured to transmit power status information to the primary gaming device 602' at predefined time intervals, such as every ten minutes, every hour, and the like.

Once the power states of each gaming device 602''' is determined, the primary gaming device 602' may transmit power reconfiguration instructions to the other gaming devices 602''' that need to be reconfigured. For example, the secondary gaming device 602" may have instructed the primary gaming device 602' to reconfigure itself to an "On" power state because the second gaming device 602" detected patrons in close proximity to the bank of gaming devices B (e.g. within approximately 100-200 feet away from the bank of gaming devices). Thus, the primary gaming device 602' may transmit a power reconfiguration instruction to any other gaming devices 602' that are not in an "On" power state. In another example, the secondary gaming device 602" may have instructed the primary gaming device 602' to reconfigure itself to a "Light Sleep" power state because the second gaming device 602" detected no activity for 30 minutes. Thus, the primary gaming device 602' may transmit a power reconfiguration instruction to any other gaming devices 602''' in the propagation pattern B that are not in a "Light Sleep" power state.

Figure 6E:
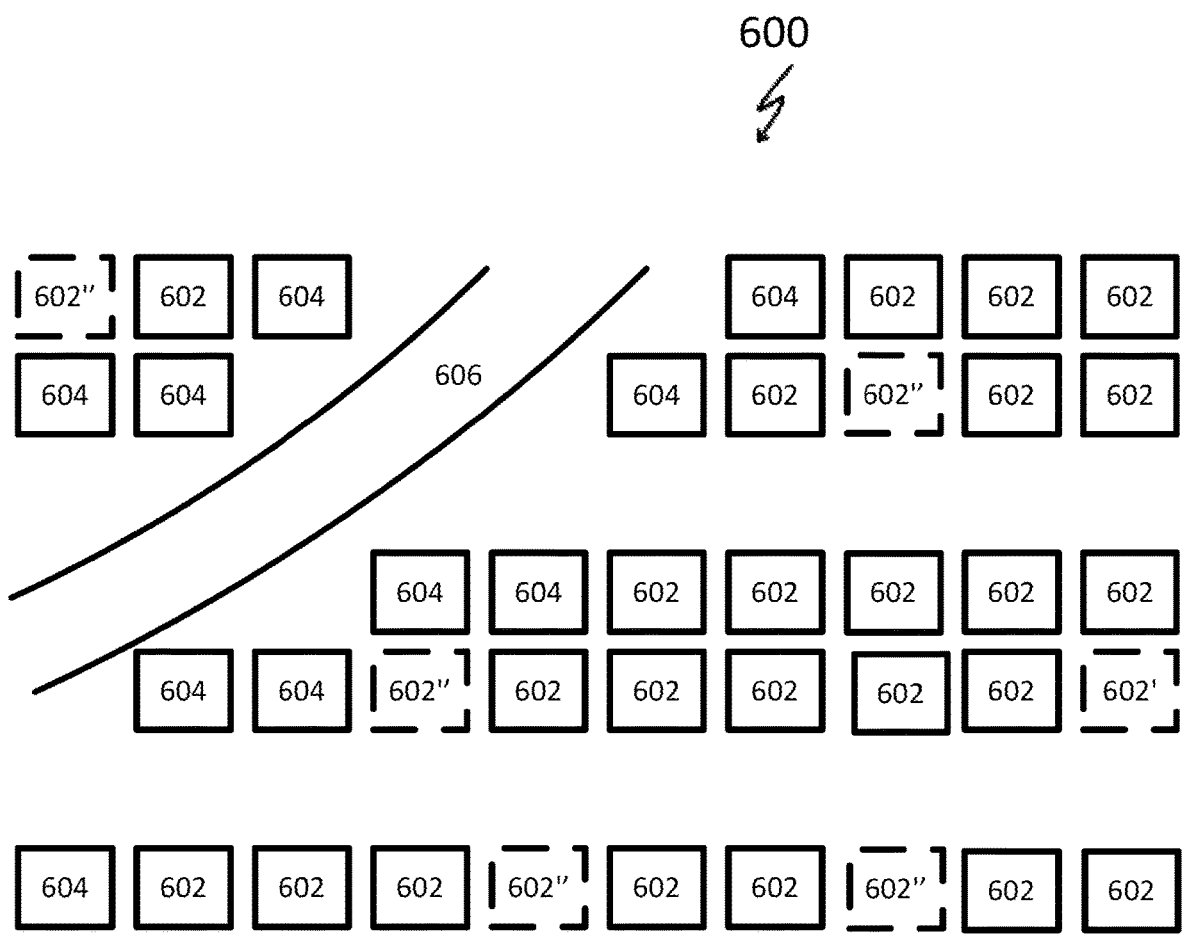

FIG. 6E illustrates yet another embodiment of a propagation pattern. The propagation pattern may be based upon the themes of the gaming devices. For example, primary gaming device 602' may be video poker themed gaming device. Thus, primary gaming device 602' may be configured to transmit power status information to other video poker themed gaming devices 602''.

Figure 7:
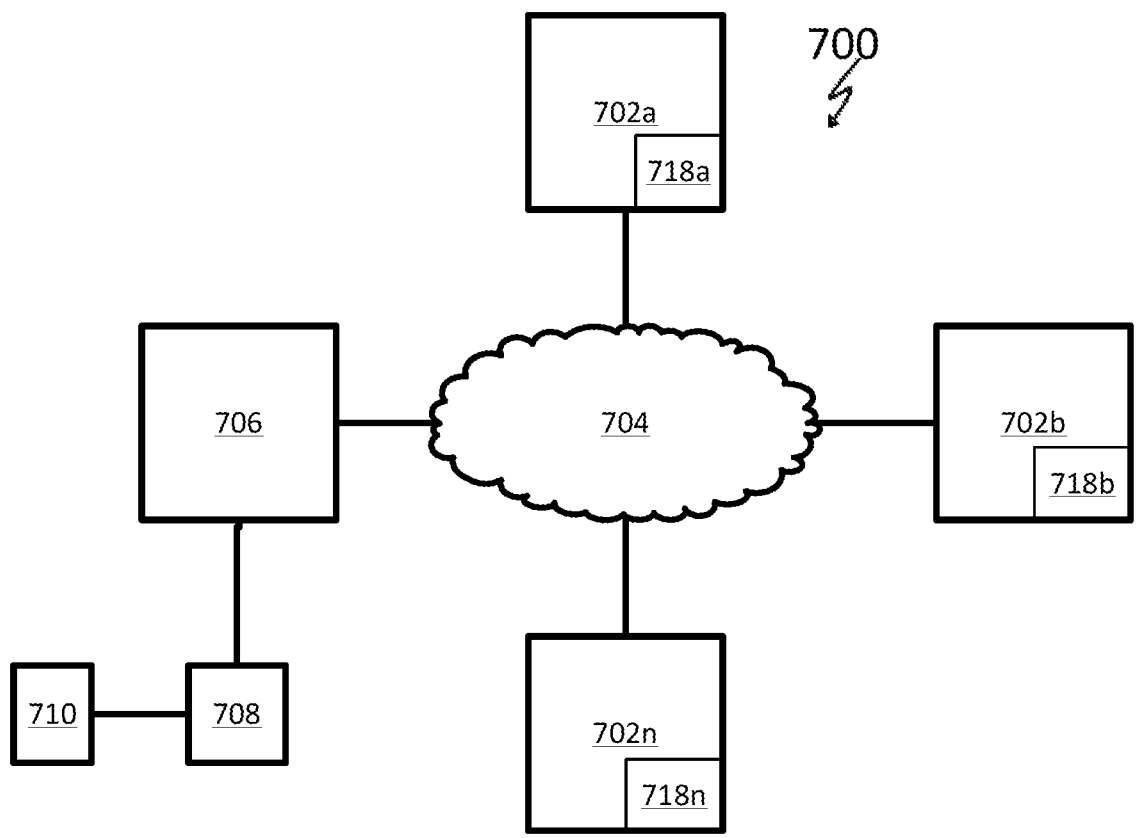
FIG. 7 illustrates a block diagram of one embodiment of a system for reducing power consumption in a network of lighting devices.

FIG. 7 illustrates a block diagram of one embodiment of a system for reducing power consumption in a network of lighting devices. The power control system 700 may have a plurality of lighting devices 702a-702n in an establishment that is configured to communicate with each other and the establishment server 706 via a network 704. The power control system 700 system may provide for a more efficient and conservative energy thereby conserving costs, provide for the maximum usage for the lighting devices 702a-n, reduce maintenance costs as well as reduce replacement costs.

Lighting devices 702a-n may be lighting used for any number of applications such as lights attached to an interior or exterior of an establishment building, touchier lights in the offices, desk lamps, and the like. Additionally, each lighting device may have at least one bulb, at least one light emitting diode, or any other number and type of lighting emitting device. The establishment may be any establishment utilizing lighting device such as an office building, casino, grocery store, mall, and the like. In one embodiment, lighting devices 702a-n may communicate with each other and the establishment server 706 via network 704 in a wireless manner. In another embodiment, lighting devices 702a-n may communicate with each other and the establishment server 706 via network 704 using any known wired technique such as an Ethernet connection and the like.

Establishment server 706 may have a memory 708 including a power management database 710. The power management database 710 may be configured to store various data. Although illustrated with the power management database 710 stored in the establishment server 706, the power management database 710 may also be stored in the lighting devices 702a-702n (not shown). Additionally, although illustrated with specific examples, that other data may be stored in the power management database 710. The power management database 710 may store various power states. The power states may include, for example, an "On" or "Awake", "Off", "Light Sleep", and/or "Hibernate" power states. Each power state may be defined, for example, by triggering events, allocation of power to each lighting device (e.g. power management rules), and any other criteria.

When configured to operate in an "On" power state, full power may be supplied to the lighting device. As such, when configured to an "On" power state, the lighting device may consume the most power. When configured to operate in an "Off" power state, no power may be supplied to the lighting device. Thus, when operating in the "Off" power state, the lighting device uses the least amount of power.

When configured to operate in a "Light Sleep" power state, a predefined amount of power may be supplied to the lighting device. For example, the lighting device may be configured to receive or use half the voltage and/or current. Thus, the lighting device may operate at half the power than when operating in the "On" power state. To a player, the lighting device may appear to be dimmed. When operating in a "Light Sleep" power state, the lighting device may use less power than operating in an "On" power state, but more power than operating in an "Off" power state. Additionally, only a limited amount of power and time is required for the lighting device to be configured from the "Light Sleep" power state to be fully functioning in an "On" power state. For example, a lighting device operating in an "Off" power state may require approximately 10 seconds to reconfigure itself to an "On" power state whereas a lighting device operating in a "Light Sleep" power state may require approximately 0.5-2 seconds to reconfigure itself to an "On" power state.

When configured to operate in a "Hibernate" power state, more power may be supplied to the lighting device than when operating in the "Off" power state, but less power than operating in the "Light Sleep" power state. In one embodiment, the lighting device may be provided with ¼ of the amount of power than operating in the "On" power state to conserve energy. The lighting device may be configured to operate in the "Hibernate" power state if it is not used within a predetermined amount of time. When operating in the "Hibernate" power state, the lighting device may also appeared to be dimmed similar to operating in the "Light Sleep" power state. However, the lighting device will appear to be more dimmed when operating in the "Hibernate" power state than in the "Light Sleep" power state.

Triggering events may also be stored in the power management database 710. The triggering events may be any predefined triggering event such as motion detected by at least one activity monitoring device 718a-n, a predetermined lighting schedule, lighting regulation compliance, and the like. The activity monitory device 718a-n may be any known detection device such as, but not limited to a motion sensor, a camera, a pressure sensor, a metal detector, and the like. The activity monitoring device 718a-n may be configured to detect activities proximate to the lighting device in the establishment, such as patrons walking in close proximity to the lighting device, detecting motion of a door, detecting pressure on the floor around the lighting device, detecting motion on a switch for the lighting device, and any other type of motion or activity. As such, the triggering events may include, but is not limited to, input from a player switch, non-activity for a predetermined time period (i.e. 30 minutes, 1 hour, 3 hours, and the like), detection of motion 100 feet away from the lighting device, detection of motion 25 feet away from the lighting device, and the like. Based on the triggering event, the establishment server may configure the lighting devices 702a-n to assume or operate in a particular power state.

Power management rules may also be stored in the power management database 710. Power management rules may be any power rules allocating the amount of power to the lighting devices 702a-n based on the triggering event. For example, if the triggering event was input from a player switch detected by the activity monitoring device 718a, the power management rule may instruct the lighting device 702a to operate in an "On" power state. In another example, if the triggering event was the detection of motion within 100 feet of the lighting device 702b by activity monitoring device 718b, then the power management rule may instruct the lighting device 702b to operate in a "Light Sleep" power state.

The power management database may also store predefined propagation patterns similar to the propagation patterns discussed above with reference to FIGS. 2, 6C and 6D. In one embodiment, a lighting device may be configured to control the power state of another lighting device by transmitting power status information to the another lighting device. The various methods by which the lighting device 702*a-n* may transmit the power status information to other lighting devices 702*a-n* may be stored in the power management database 710 as propagation patterns. Example propagation patterns may be lighting devices on the same floor, lighting devices in predefined zones of the establishment space, neighboring lighting devices only, and the like.

In one embodiment, in use, the establishment server 706 may receive power status information from each of the lighting device 702*a-n*. Based on the power status information received from each lighting device 702*a-n*, the establishment server 706 may transmit a response including power reconfiguration instructions instructing lighting device 702*a* to power itself to a certain power state as discussed above. The response may also include instructions to propagate and transmit the power reconfiguration instruction to other lighting devices 702*b-n*.

In another embodiment, lighting device 702*a* may be configured to control power to itself and to the other lighting devices 702*b-n*. For example, lighting device 702*a* may determine that activity monitoring device 718*a* did not detect any motion for 30 minutes and based on the power management rules, needs to reconfigure itself to a "Light Sleep" power state. Lighting device 702*a* may then, based on the predefined propagation pattern, transmit a power status information to a neighboring lighting device 702*b*. The power status information transmitted to the neighboring lighting device 702*b* may include information that no activity was detected for 30 minutes and power reconfiguration instructions to configure lighting device 702*b* to a "Light Sleep" power state. In one embodiment, the power status information may also include propagation instructions for lighting device 702*b* to transmit the power reconfiguration instructions to other lighting devices 702*n* in the propagation pattern.

Figure 8A:
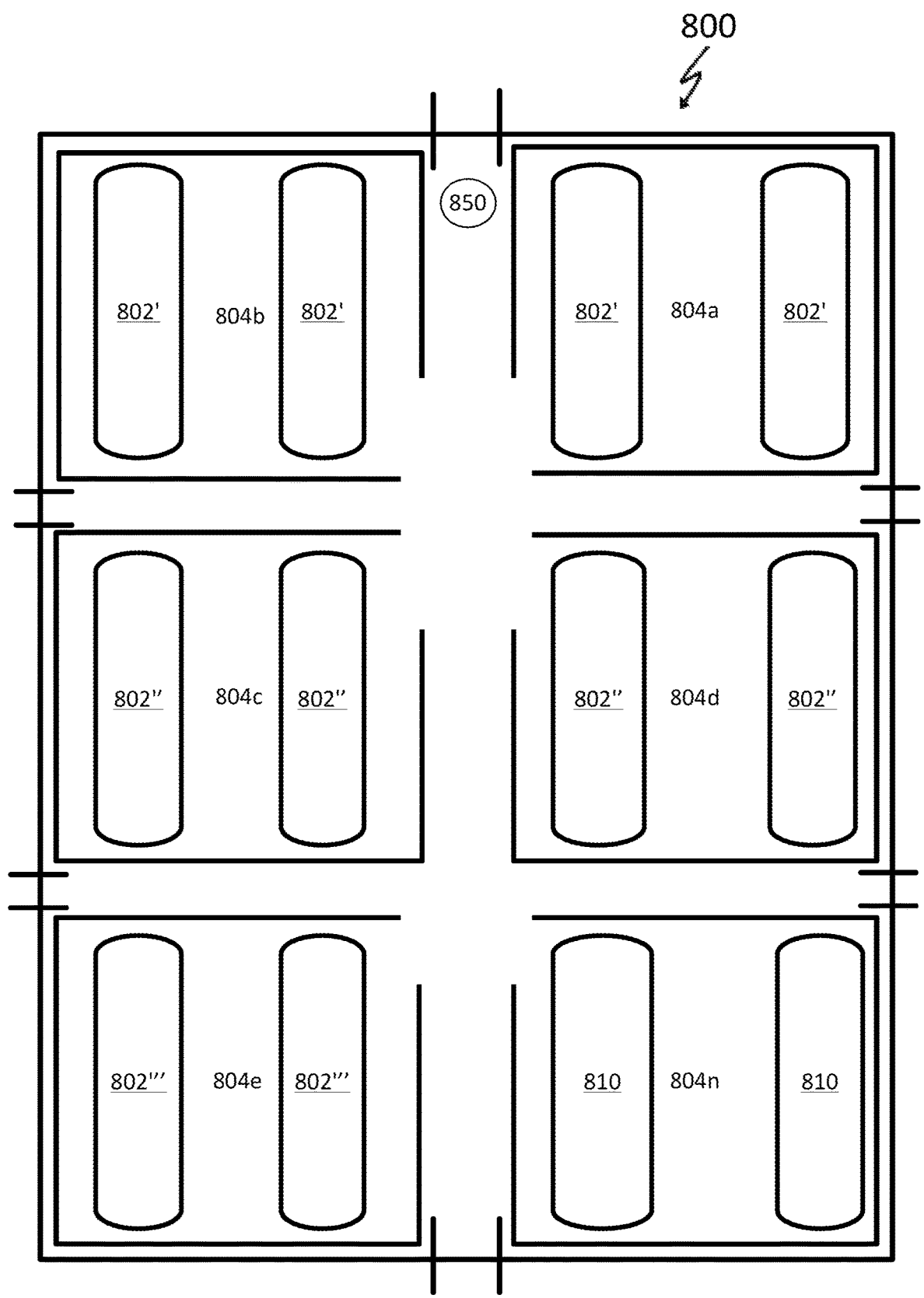
FIGS. 8A-8C illustrate diagrams of an example office building floor plan having a network of lighting devices.
Figure 8B:
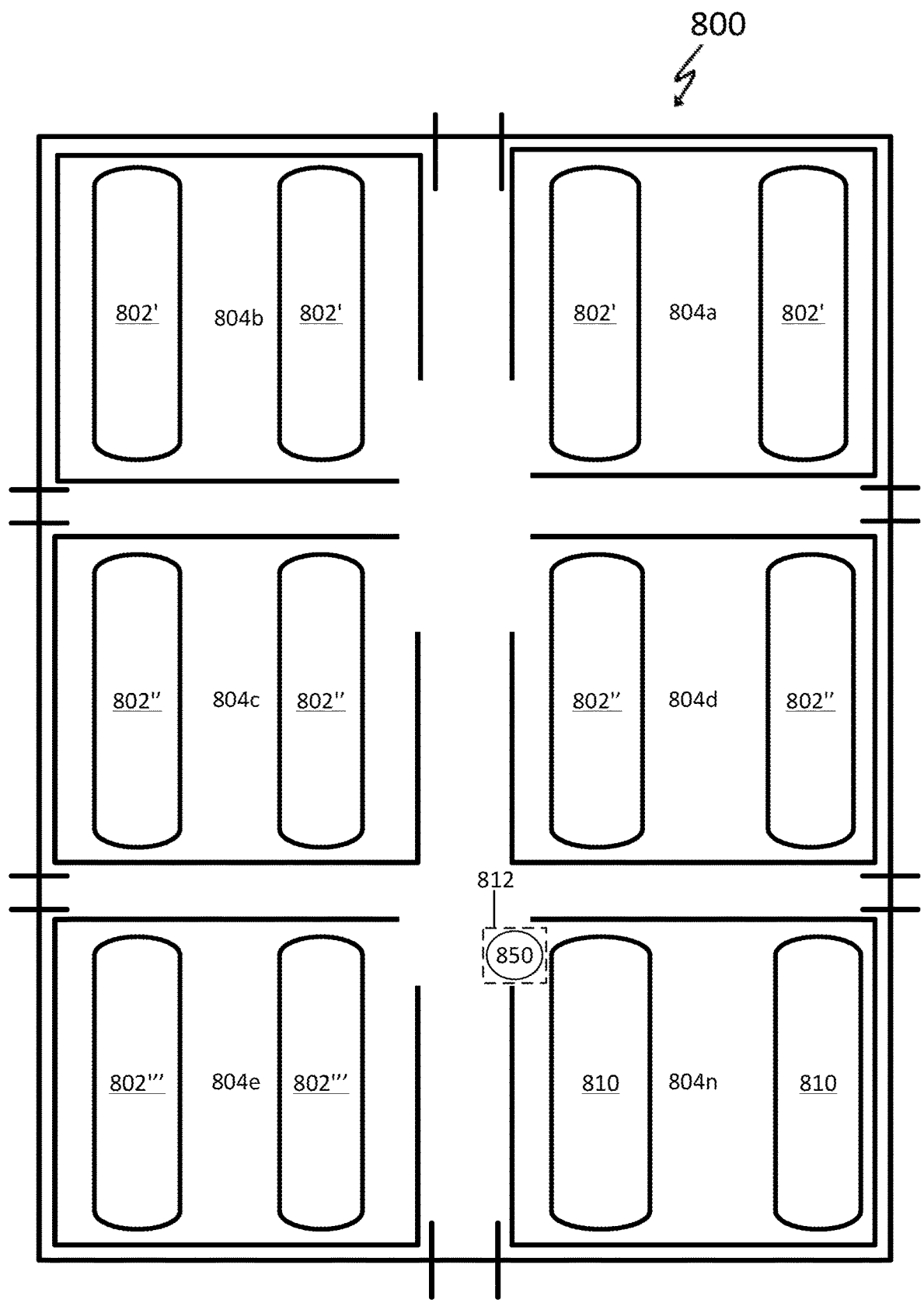
Figure 8C:
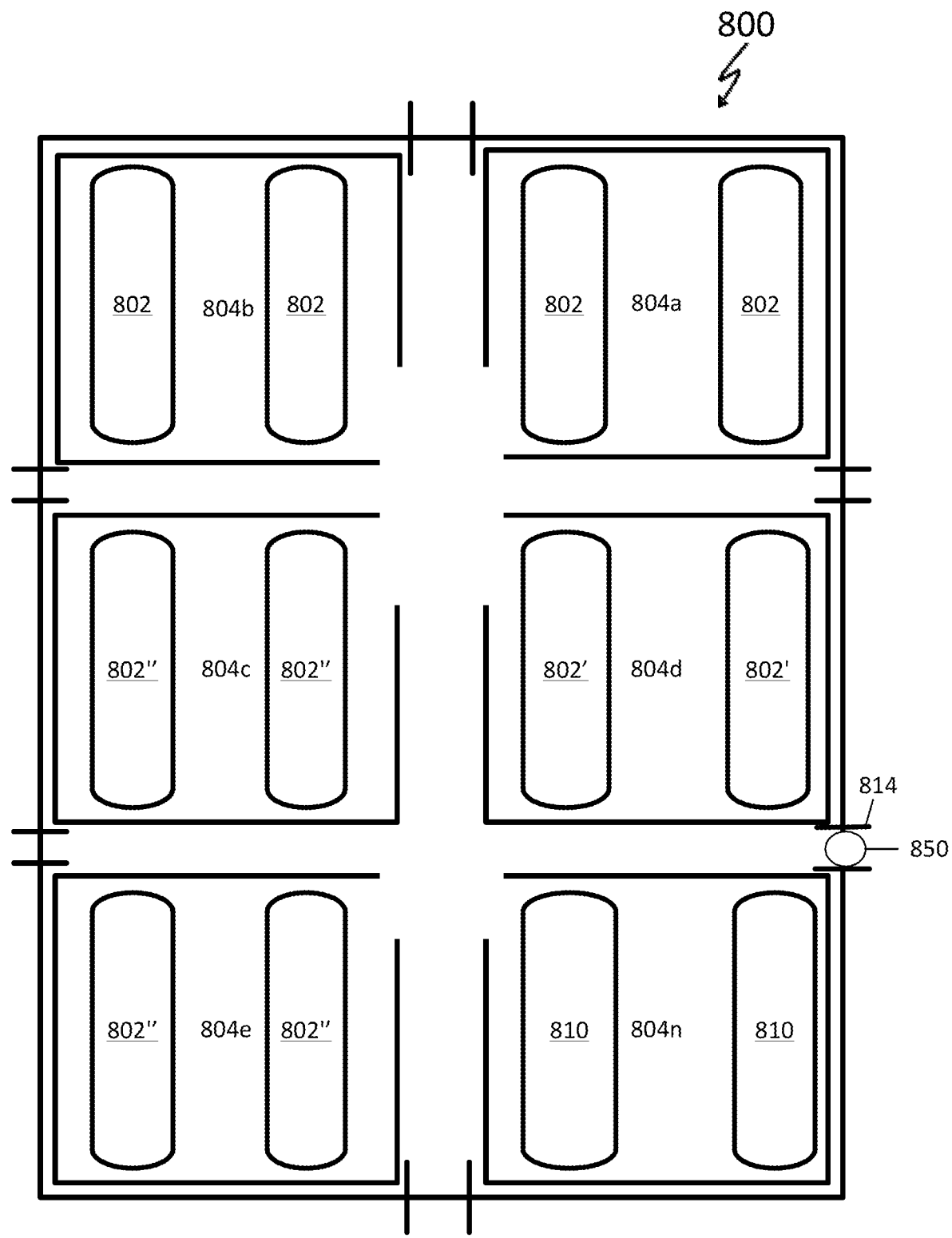

FIGS. 8A-8C illustrate diagrams of an example office building floor plan having a network of lighting devices. The office building 800 may have a plurality of offices 804*a-n*, each plurality of offices 804*a-n* having at least one lighting device 802. Each of the at least one lighting devices 802 may be configured to communicate with each other as well as an office server (not shown) such as the establishment server 706 illustrated in FIG. 7. Lighting devices 802 may by any type of lighting device, such as light on the ceiling of the office 804*a-n*, desk lamps on a desk in the office 804*a-n*, or any other type of device designed to emit light. By controlling the power allocated to each lighting device 802 in an office building 800, energy use is more efficient and may be conserved thereby conserving costs, providing for the maximum usage of the lighting device 802, and reducing maintenance costs as well as replacement costs.

As illustrated in FIG. 8A, an activity monitoring device in at least one lighting device 802' in at least one location 804*a-b* may detect motion by a player 850. In one embodiment, lighting devices 802' may transmit power status information to the office server informing the office server that the lighting device 802' are in an "Off" power state and that motion was detected proximate to the lighting devices 802'. Lighting devices 802' may then wait for a response from the office server with power reconfiguration instructions.

In another embodiment, lighting device 802' may automatically reconfigure their power states. Light devices 802' may retrieve or determine a power control rule (stored in a power management rules database 710 in FIG. 7) based upon the detection of motion from the player 850. For example, the power control rule may be to instruct the lighting devices 802' to automatically reconfigure their power states to a "Light Sleep" power state. The lighting devices 802' may also transmit power status information to other lighting devices in a propagation pattern, for example, light devices 802" which immediately neighbor the office 804*a-b*. The power status information may include information about the detection of a player and power state information informing lighting devices 802" that lighting devices 802' are operating in a "Light Sleep" power state.

Referring now to FIG. 8B, as the player 850 continues to walk through the office, upon the non-detection of the player entering offices 804*a-b*, the lighting devices 802' may retrieve a power control rule instructing the lighting devices to reconfigure or operate in an "Off" power state. Additionally, upon the non-detection of the player entering offices 804*c-d*, the lighting devices 802" may retrieve a power control rule instructing the lighting devices 802" to also reconfigure or operate in an "Off" power state.

As discussed above, activity monitory device 812 may be any known presence or proximity detection device 812. For instance, when player 850 steps into location 804*n*, pressure may be detected on the presence detection device 812 from the weight of the player 850. The detection of pressure may be transmitted to lighting device 810. In one embodiment, power status information may be transmitted to the officer server. In another embodiment, the lighting device 810 may retrieve power control rules to determine which state it should be operating at. For example, the power control rule may instruct the lighting device 810 to operate in an "On" power state if pressure was detected at the pressure detection device 812.

In another embodiment, lighting device 804*n* may transmit a power status information to lighting device 802 including information that the player entered office 804*n* and to instruct the lighting device 802 to configure itself to an "Off" power state. In another embodiment, lighting device 804*n* may transmit a power status information to establishment server including information that the player entered office 804*n* and that it configured itself to an "On" power state. In response to the power status information received from lighting device 810, the establishment server may transmit power reconfiguration instructions to the other lighting devices 802, 802', 802" to operate in an "Off" power state.

FIG. 8C illustrates another example embodiment of a triggering event. Lighting devices 802', 810 may detect the motion of entrance 814 opening. Lighting devices 802', 810 may determine the power state it should operate at based upon retrieved power control rules. For example, the power control rules may instruct the lighting devices 802', 810 to operate in an "On" power state. Lighting devices 802', 810 may also transmit a power status information to other lighting devices in a predefined propagation patter and office server. For example, lighting devices 802', 810 may transmit a power status information to lighting devices 802" informing them of the motion detected as well as their current operating power status.

It will be apparent to one skilled in the art that the present description may be practiced without some or all of the specific details described herein. The preceding examples, illustrations, and contexts should not be taken as definitive or limiting either in scope or setting. Although these embodiments are described in sufficient detail to enable one skilled in the art to practice the described embodiments, these examples, illustrations, and contexts are not limiting, and other embodiments may be used and changes may be made without departing from the spirit and scope of the disclosure. For example, although the descriptions above described a network of gaming devices and office lighting devices, this is not intended to be limiting, as the invention may be used in other types of environments and devices such as air conditioning systems, lighting display systems in a department store or warehouse, networked computers in an office building, street lights, and the like.

While embodiments and applications of this invention have been shown and described, it would be apparent to those skilled in the art having the benefit of this disclosure that many more modifications than mentioned above are possible without departing from the inventive concepts herein. For example, the power management database may include the quantity of power to be supplied to each peripheral, component, and/or device based upon the power state.

What is claimed is:

1. A gaming system comprising:
    a plurality of gaming devices interconnected via a network;
    a server coupled to the plurality of gaming devices via the network, and having at least one processor and memory storing a plurality of management rules and instructions, which, when executed, cause the at least one processor to at least:
        receive an operating parameter and a first propagation pattern from a first gaming device of the plurality of gaming devices at a second gaming device;
        retrieve a first management rule of the plurality of management rules for the second gaming device;
        configure an operating state of a peripheral device coupled to the second gaming device based on the operating parameter received via the first propagation pattern, and the first management rule retrieved; and
        transmit the operating state of the peripheral device from the second gaming device to a third gaming device of the plurality of gaming devices based on the first propagation pattern.

2. The gaming system of claim 1, wherein the first management rule impacts an operation of a third peripheral device of the third gaming device.

3. The gaming system of claim 1, wherein the instructions, when executed, cause the processor to determine a plurality of different operating states for a subset of the plurality of gaming devices based in part on the first propagation pattern.

4. The gaming system of claim 1, wherein the instructions, when executed, cause the processor to adjust the operating state of the peripheral device coupled to the second gaming device.

5. The gaming system of claim 1, wherein the instructions, when executed, cause the processor to confirm at least one of a receipt of the operating parameter from the first gaming device, a configuration of the operating state of the peripheral device coupled to the second gaming device, and a triggering event has not been detected by any of the plurality of gaming devices and a reconfiguration of the second gaming device is not instructed.

6. The gaming system of claim 1, wherein the instructions, when executed, cause the processor to receive the operating parameter and the first propagation pattern from the first gaming device in response to determining that a triggering event has been detected.

7. The gaming system of claim 6, wherein the instructions, when executed, cause the processor to determine the triggering event with an activity monitoring device.

8. A method of operating a plurality of gaming devices interconnected via a network in a gaming establishment, the method comprising:
    receiving an operating parameter and a first propagation pattern from a first gaming device of the plurality of gaming devices via the network at a second gaming device;
    retrieving from the second gaming device a control rule;
    configuring an operating state of a peripheral device coupled to the second gaming device based on the operating parameter received via the first propagation pattern, and the control rule retrieved; and
    transmitting the operating state of the peripheral device from the second gaming device to a third gaming device of the plurality of gaming devices based on the first propagation pattern.

9. The method of claim 8, wherein the control rule impacts an operation of a third peripheral device of the third gaming device.

10. The method of claim 8, further comprising determining a plurality of different operating states for a subset of the plurality of gaming devices based in part on the first propagation pattern.

11. The method of claim 8, further comprising adjusting the operating state of the peripheral device coupled to the second gaming device.

12. The method of claim 8, further comprising confirming at least one of a receipt of the operating parameter from the first gaming device, the configuring of the operating state of the peripheral device coupled to the second gaming device, and a triggering event has not been detected by any of the plurality of gaming devices and a reconfiguration of the second gaming device is not instructed.

13. The method of claim 8, further comprising receiving the operating parameter and the first propagation pattern from the first gaming device in response to determining that a triggering event has been detected.

14. The method of claim 13, further comprising determining the triggering event with an activity monitoring device.

15. A non-transitory computer-readable medium comprising a plurality of management rules and instructions, for managing on a gaming system having a server coupled to a network of devices, the server having a controller that includes one or more processors, and the instructions, which, when executed, cause the one or more processors to perform the steps of:
    monitoring the network of devices for a triggering event;
    receiving an operating parameter and a first propagation pattern from a first device in the network of devices via the network of devices at a second device in response to determining that the triggering event has occurred;
    retrieving from the second device a first management rule;
    configuring an operating state of a peripheral device coupled to the second device based on the operating parameter received via the first propagation pattern, and the first management rule retrieved; and
    transmitting the operating state of the peripheral device from the second device to a third device of the network of devices based on the first propagation pattern.

16. The non-transitory computer-readable medium of claim 15, wherein the first management rule impacts an operation of a third peripheral device of the third device.

17. The non-transitory computer-readable medium of claim 15, wherein the instructions, when executed, further cause the one or more processors to determine a plurality of different operating states for a subset of the network of devices based in part on the first propagation pattern.

18. The non-transitory computer-readable medium of claim 15, wherein the instructions, when executed, further cause the one or more processors to adjust the operating state of the peripheral device coupled to the second device.

19. The non-transitory computer-readable medium of claim 15, wherein the instructions, when executed, further cause the one or more processors to confirm at least one of a receipt of the operating parameter from the first device, the configuring of the operating state of the peripheral device coupled to the second device, and the triggering event has not been detected by any of the network of devices and a reconfiguration of the second device is not instructed.

20. The non-transitory computer-readable medium of claim 15, wherein the instructions, when executed, further cause the one or more processors to monitor the network of devices for the triggering event via one or more activity monitoring devices.

* * * * *